(12) United States Patent
Singh et al.

(10) Patent No.: US 7,917,877 B2
(45) Date of Patent: Mar. 29, 2011

(54) SYSTEM AND METHOD FOR CIRCUIT SCHEMATIC GENERATION

(75) Inventors: Balvinder Singh, Haryana (IN); Donald O'Riordan, Sunnyvale, CA (US); Bogdan George Arsintescu, San Jose, CA (US); Alka Goel, Haryana (IN); Devendra Ramakant Deshpande, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 397 days.

(21) Appl. No.: 12/118,558

(22) Filed: May 9, 2008

(65) Prior Publication Data

US 2009/0282379 A1    Nov. 12, 2009

(51) Int. Cl.
*G06F 17/50* (2006.01)
(52) U.S. Cl. .......................... 716/118; 716/119; 716/126
(58) Field of Classification Search ................ 716/8, 12, 716/118, 119, 126
See application file for complete search history.

(56) References Cited

U.S. PATENT DOCUMENTS

| | | | | |
|---|---|---|---|---|
| 6,980,211 | B2 * | 12/2005 | Lin et al. | 345/440 |
| 7,571,411 | B2 * | 8/2009 | Hentschke et al. | 716/12 |
| 2005/0107993 | A1 * | 5/2005 | Cuthbert et al. | 703/2 |
| 2005/0278670 | A1 * | 12/2005 | Brooks et al. | 716/5 |
| 2009/0083689 | A1 * | 3/2009 | Ringe et al. | 716/12 |
| 2010/0095262 | A1 * | 4/2010 | Garg et al. | 716/9 |

* cited by examiner

*Primary Examiner* — Stacy A Whitmore
*Assistant Examiner* — Magid Y Dimyan
(74) *Attorney, Agent, or Firm* — Sheppard Mullin Richter & Hampton LLP

(57) ABSTRACT

The present invention provides a system and method for generating circuit schematic that includes extracting connectivity data of a plurality of devices from a netlist, categorizing the plurality of devices into groups, placing Schematic Analog Placement Constraints on all the instances by identifying instances among the groups that match with a circuit template (in-built as well as user-specified), creating a BFS instance tree of tree instances, creating a two terminal device clusters and creating instance attachments. Using the constraints during grid based placement and eventually generated schematic which look like analog schematic.

24 Claims, 20 Drawing Sheets

SYSTEM AND METHOD FOR CIRCUIT SCHEMATIC GENERATION

TECHNICAL FIELD

The present invention relates to a schematic generator and more particularly, some embodiments relate to method for automatically generating a schematic from one or more netlists in analog or mixed-signal formats ( like CDL, SPECTRE, Verilog-AMS etc).

DESCRIPTION OF THE RELATED ART

Conventional automatic schematic generators used by current CAD system employ placement algorithms that follow digital design conventions. Unlike digital circuit schematics, which typically have a left-to-right flow and are optimized for wire length and area, analog circuit schematics are typically hand-drawn and optimized for ease of interpretation using intuitive placement of circuit elements. Hand-drawn analog schematics are generated with predefined circuit templates (e.g. current mirrors and darlington pairs, etc.). Relative placement of devices and higher order design components such as transistors and differential pairs allows the viewer to quickly interpret and understand the circuit behavior. A well-drawn and well-placed analog circuit schematic projects a substantial amount of data and necessary information regarding the analog circuit design. The functionality of such a hand-drawn schematic can be quickly inferred by looking at symmetries, alignments, placement of transistors relative to one another, and placement of various stages/circuit templates with respect to each other and to the various input/output and power pins. Conventional schematic generators cannot automatically reproduce the functionality, interpretability, and quality as described above of a hand-drawn analog circuit schematic.

BRIEF SUMMARY OF EMBODIMENTS OF THE INVENTION

According to various embodiments of the invention, systems and methods for generating a circuit schematic are provided. In accordance with one embodiment of the invention, a method for generating a circuit schematic includes: identifying a first group instances that match a circuit template among groups of devices; defining placement and constraint data for instances of the first group; creating a circuit schematic having a grid by placing instances of the first group in a column of the grid based on the placement and constraint data; assigning a row to instances of the first group within the grid based on the placement and constraint data; and routing the instances of the first group using the placement and constraint data.

In an embodiment, the first group of instances comprises n-type MOSFET transistor device (NMOS), a p-type MOSFET transistor device (PMOS), a NPN Bipolar transistor device (NTX), and a PNP Bipolar transistor device (PTX).

In an embodiment, the defining placement and constraint data process includes specifying terminal pairs of instances; determining relative position information of instances connected to these terminal pairs; specifying orientation information for instances connected to these terminal pairs; and determining augmentation information for instances connected to these terminal pairs.

In another embodiment, connectivity data of the first group of instances are extracted from a netlist. In yet another embodiment, the circuit template used above comprises a built-in template.

In yet another embodiment, the built-in template is integrated with an external input with such that there is no conflict between the external input and the built-in template. The external input may include connectivity, placement, orientation, and augmentation data. In one embodiment, the external input can be used to override the built-in template.

In still another embodiment, the circuit schematic is created by assigning a relative row and column location within the template grid to instances of the first group based on the relative position and augmentation information.

In yet another embodiment, placement and orientation data for a second group of instances from the groups of devices are defined by replacing the second group of instances with a first and a second dummy groups. This process further includes creating the circuit schematic by placing the first and second dummy groups in a column of the grid; and assigning a row location within the grid to the dummy groups based on the placement and orientation data.

In still another embodiment, the second group comprises two-terminal devices. Further, the first and second dummy groups comprise a resistor-capacitor circuit cluster and a series-parallel circuit cluster, respectively.

In another embodiment, the defining placement and constraint data includes the process of creating a placement grid by placing an instance of the first group on a branch of the schematic tree based on a connectivity information of the instance.

In yet another embodiment, creating the circuit schematic process includes placing instances of the first group in a column of the circuit schematic using a connection information of the tree branch in which the instances are placed.

In yet another embodiment, the defining placement and constraint data process includes creating a placement grid by placing an instance of the first group on a branch of the schematic tree randomly.

In still another embodiment, creating the schematic tree further includes: specifying a power net; identifying and importing port information of instances in the first group having a top port being connected to the specified power net; identifying a second group having a top being connected to a bottom port of instances in the first group; and identifying and importing port information of instances in the first group having a top port being connected to the second group.

In one embodiment of the present invention, a computer program product comprising a computer useable medium having computer readable program code functions embedded in the medium for causing a computer to create a circuit schematic is provided: The computer readable program code is configured to cause the computer to: identify a first group instances that match a circuit template among groups of devices; define placement and constraint data for instances of the first group; create the circuit schematic having a grid by placing instances of the first group in a column of the grid based on the placement and constraint data; and assign a row to instances of the first group within the grid of the circuit schematic based on the placement and constraint data.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
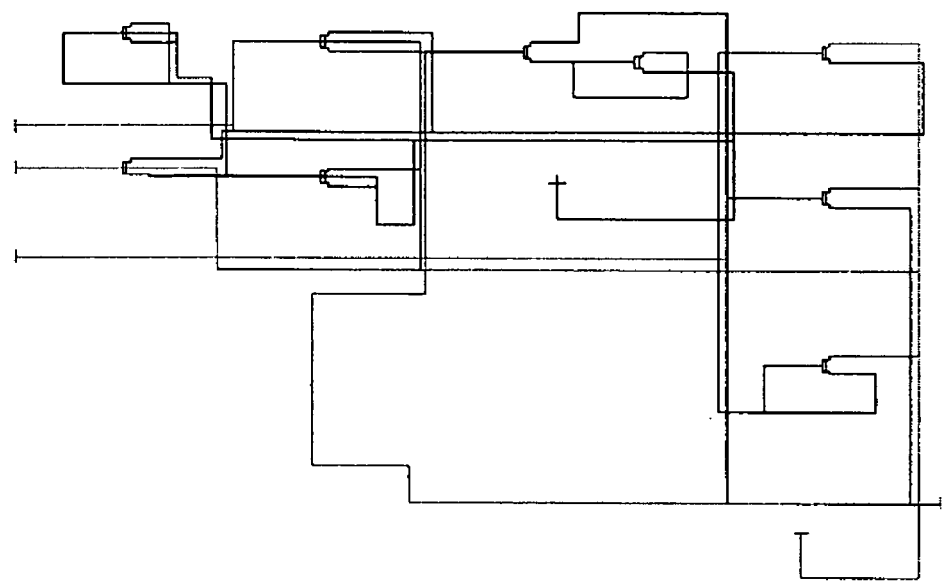
FIG. 1 illustrates an example circuit schematic generated by a conventional schematic generator.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

1. Overview

Before describing the invention in detail, it is useful to describe an example environment in which the invention might be implemented. In one embodiment, the invention can be implemented using computer-aided design software running on a computer or computing system. The computer or computing system might be a personal computer, workstation, minicomputer, mainframe, etc. The computer might include various input devices, such as a keyboard, mouse, trackball, etc.; various output devices, such as a monitor, printer etc.; various communication ports such as network connections, USB ports, serial and parallel I/O ports, etc.; and various storage devices, such as ROM, RAM, disk drives, magnetic disks, magnetic tape drives, etc.

Monitors and printing devices can be used to provide a visual display of the design as well as other ancillary information to aid the developer in the design process, including various GUIs, graphical representations and other information. Storage devices, whether networked or local, can be used to store data and other information including design tools, design kit information, libraries and so on.

The CAD software, system, or application of the present invention is, in one embodiment, designed to aid circuit designers to better visualize and test a circuit under simulation. As described below, the CAD application is a small but essential portion of the circuit design process. Generally, the circuit design process starts with a textual circuit netlist. A netlist is a file that contains information regarding the connectivity of circuit elements. Typically, a netlist is a text based file that may be in various formats such as plaintext, CDL, SPECTRE, or Verilog AMS.

In general, text-based netlists can come from a variety of sources. For example, a netlist may be hand-entered using a textual editor such as vi, emacs, MS Notepad, etc. Another source is via export from a CAD system that is different from the system in which the netlist is being used (e.g. an export from a Viewlogic system to be used in a Cadence system or from an OpenAccess database). Textual netlist may be used as a "common" interchange format. A netlist for the target system may be created from the source system via some form of data translator. Another example might be a SPICE-to-CDL converter program, which converts SPICE netlists into CDL netlists automatically. Textual netlists contain the electrical connectivity information sufficient to simulate the circuit behavior or analyze it in other CAD applications; however, they typically do not contain placement and routing information in the form of a human readable schematic. As such, a lot of information is lost or missing in schematics generated by conventional Placement & routing engines, that is, the visual information (such as relative placement and alignment etc) that could easily allow a human trained in the art of circuit design to understand the operation of the circuit represented by the text netlist. Since visual circuit schematics are often easier to work with than textual netlists, especially those schematics in which the relative placement and alignment information etc is present according to the commonly accepted standards, it is therefore a goal of the present invention to infer that placement and alignment information from a connectivity-only representation (i.e. from a textual netlist), by inspection of the devices and connectivity, and comparison against a library of templates representing commonly understood (to those trained in the art of circuit design) topologies. From the connectivity specified in the textual netlist, and the inferred placement and alignment information gleaned from it, a fully placed and routed schematic is therefore produced that is humanly intuitive, following the analog and/or mixed-signal circuit design conventions.

FIG. 1 illustrates an example circuit schematic 100 generated by a conventional schematic generator. As shown, schematic 100 is relatively hard to read. Particularly, it is hard to differentiate between circuit elements that are close together. For example, it is hard to differentiate between the gate and drain of a transistor. Another unfavorable aspect of schematic 100 is the sketch of the connecting wires, which at times seem to run atop of each other. Schematic 100 is a good example where a conventional schematic generator optimizes the layout to reduce the number and length of wires.

Figure 2:
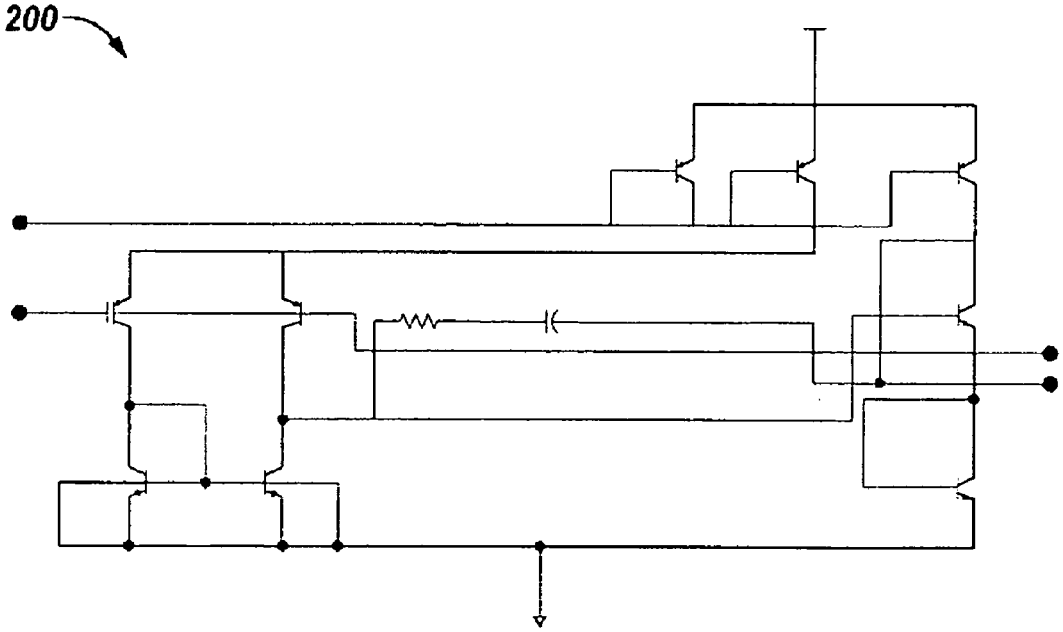
FIG. 2 illustrates an example circuit schematic generated by a schematic generator according to an embodiment of the present invention.

FIG. 2 illustrates an example circuit schematic 200 generated by an automatic schematic generator according to an embodiment of the present invention. Schematic 200 shows a circuit schematic generated from the same or similar netlist used by the conventional schematic generator to generate schematic 100. As shown in FIG. 2, schematic 200 has better resolution than schematic 100. Additionally, wires in schematic 200 are no longer drawn atop of each other and individual transistor is much easier to identify. Overall, it is much easier to interpret and comprehend schematic 200 than schematic 100.

As mentioned, schematic 200 is generated by an automatic schematic generator according to embodiments of the present invention. The automatic schematic generator may be integrated into the CAD application or it can be a standalone application. According to embodiments of the present invention, the automatic schematic generator includes algorithms to interpret data from one or more circuit netlists. The algorithms can be implemented to render the netlist data into useful and comprehensible schematics with readily identifiable analog circuit building blocks, which are laid out in a recognizable manner. The automatic schematic generator can also include templates that contain recognized topologies that are user-programmable. This allows the automatic schematic generator application to be customizable and extendable to more than just a hard-coded application.

User-programmable in the above context means that a user may, for example, specify templates having placement, orientation and augmentation information such that the circuit placements in the final circuit schematics are customizable. The user specified templates may also be used to override the built-in templates. In this way, the user has more control over the final placements and orientations compared to what would be produced using a conventional schematic generator.

In one embodiment, the automatic schematic generator presents connectivity information using an open industry standard database such as the OpenAccess standard. OpenAccess is used for standard flows that require schematic connectivity information. The results of the automatic schematic generator produce a fully placed and routed OpenAccess schematic database that can be used in other circuit design applications, even those that are not based on the Virtuoso® Schematic Editor by Cadence Design Systems Inc., a California corporation. In alternative embodiments other database standards such as EDIF may be used. This fully placed and routed Schematic database can then be rendered in an OA compliant schematic viewer, edited by an OA compliant schematic editor (e.g. Cadence Virtuoso® Schematic Editor), and used as a reference source for a schematic driven layout, etc. In one embodiment of the automatic schematic generator of the present invention, conversion from in-memory P&R schematic representation to the output OA schematic database is performed directly.

Having thus described a few example embodiments in terms of an example environment where design software can run on a computer, we will now discuss further example embodiments of methods and systems for physical hierarchy configuration in terms of this example environment. These methods and systems may include one or more software modules configured for data gathering, data preparation, customization, and schematic generation. After reading this description in terms of this environment, it will become apparent to one of ordinary skill in the art how alternative embodiments can be provided and how the invention can be implemented in alternative environments.

2. The Automatic Schematic Generator

Figure 3:
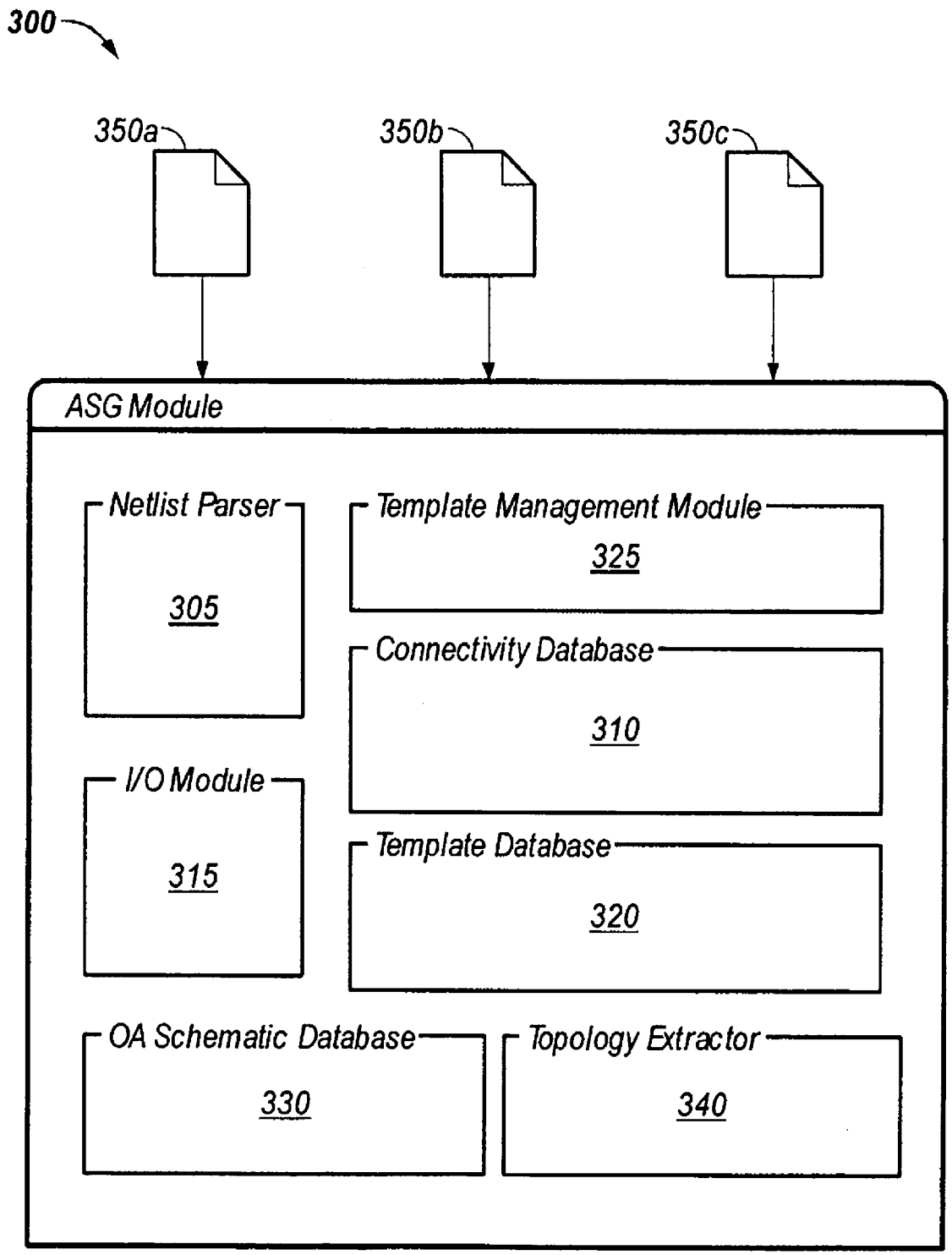
FIG. 3 illustrates a schematic generator application in accordance with an embodiment of the present invention.

FIG. 3 illustrates the general architecture of an automatic schematic generator 300 according to an embodiment of the present invention. In one embodiment, automatic schematic generator 300 is an integrated software module of a CAD application. Alternatively, automatic schematic generator 300 is a standalone application that can be executed on a local computer system or on a remote server. In another embodiment, automatic schematic generator 300 is a web-based application. In the example shown in FIG. 3, automatic schematic generator 300 includes various functions or software modules such as a parser 305, a common connectivity database 310, an I/O module 315, a template database 320, a template manager 325, a OA schematic database 330, and a topology extractor 340.

Automatic schematic generator 300 starts the schematic generation process by first gathering data from one or more netlists 350*a-c*, which may come in a variety of formats such as, for example, SPICE (Simulation Program with Integrated Circuit Emphasis), CDL, Spectre, Verilog-A, Verilog-AMS, VHDL-AMS or other suitable formats. Automatic schematic generator 300 can be configured to work with one or more of these netlist formats in various embodiments. This broad format compatibility can allow automatic schematic generator 300 to be versatile. In this way, circuit designers may import data from various types of netlist into their circuit design. As mentioned, a netlist is a data file that contains information on circuit elements and their connectivity.

The two most common types of netlists are instance-based and net-based. An instance based netlist classifies each reoccurring circuit element as an instance and identifies all of the instances in the circuit. Each of the instances will also be populated with port data, net connection data, and pairing data, etc. A net-based netlist also identifies all of the instances of a circuit, but port and pairing data, for example, for each instance are organized with its associated net data. Net data generally includes connection data of each port and/or instance relative to other ports and/or instances.

Figure 4:
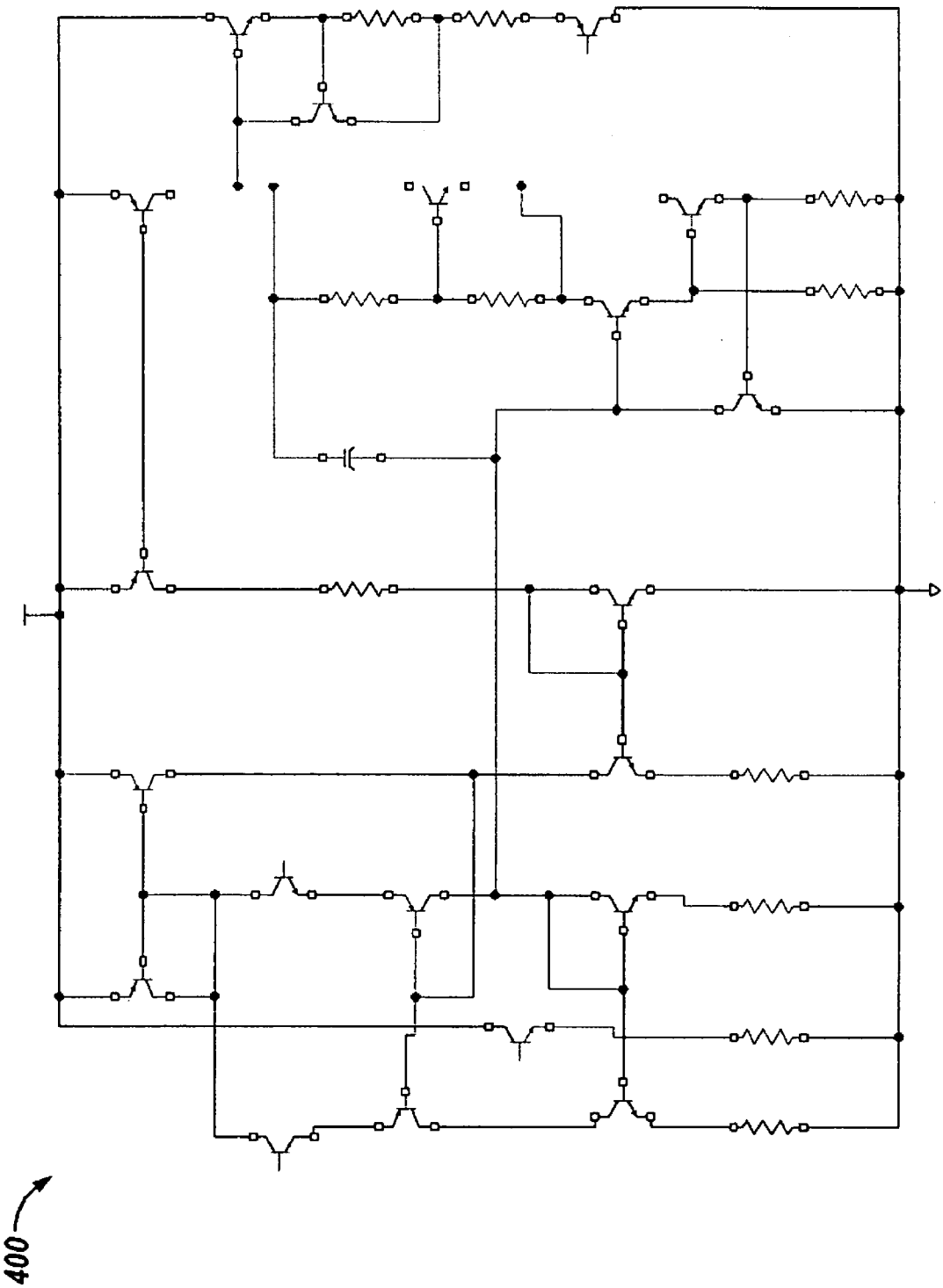
FIG. 4 illustrates an example hand-drawn circuit schematic.

In the circuit design process, the use of automatic schematic generator 300 typically comes after a circuit netlist has been defined. This netlist serves as input to automatic schematic generator 300 and allows automatic schematic generator 300 to reconstruct the circuit layout for testing. After changes are made, if there are any, the CAD application updates the netlist to reflect the changes made. FIG. 4 illustrates an example of a circuit schematic 400 designed manually by circuit designers. Circuit designers design the layout of circuit schematic 400 manually, meaning the final schematic was primarily generated without computer assistance. To test circuit 400, circuit designers first create a netlist that defines all of the circuit elements and their connectivity.

Figure 5:
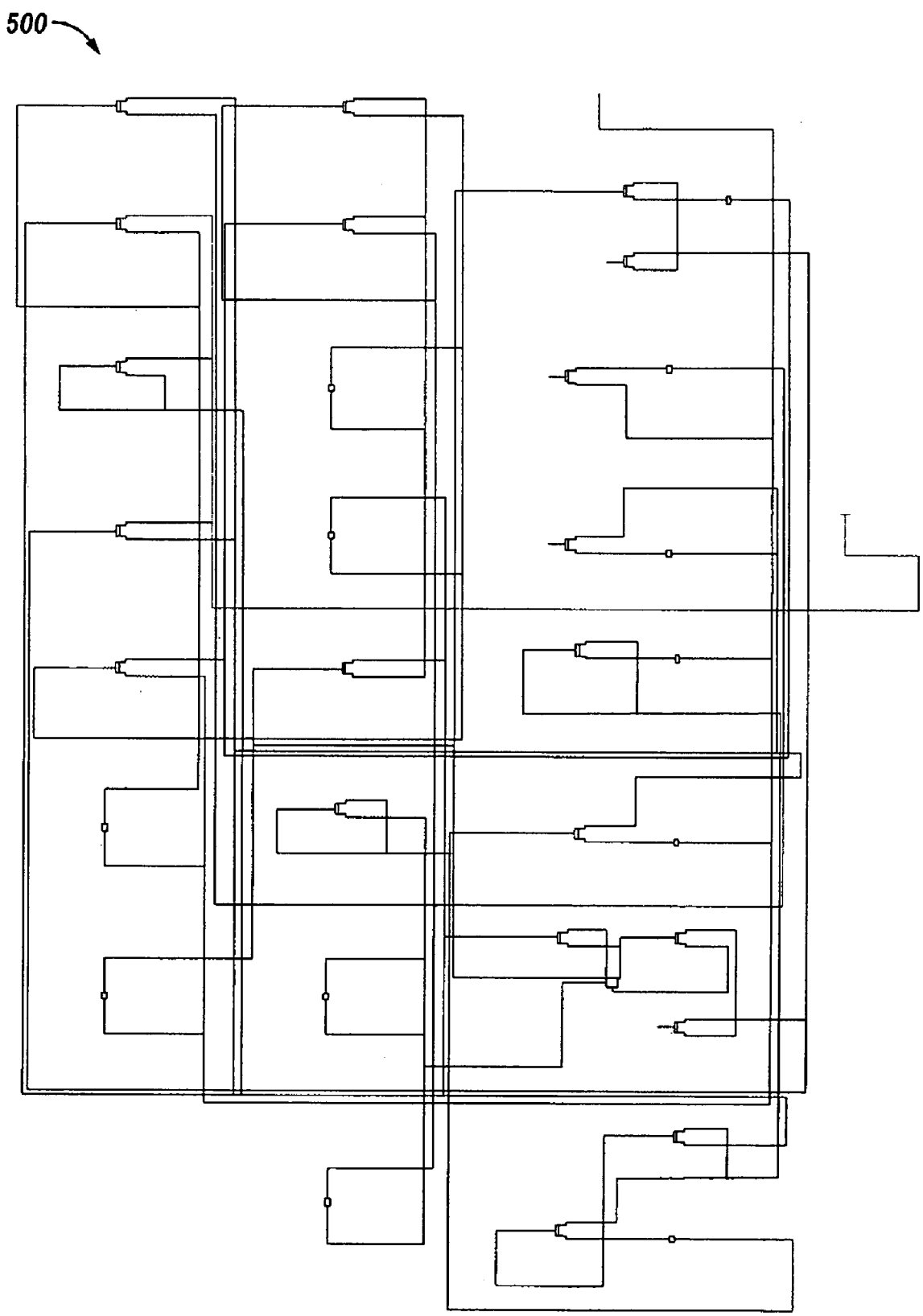
FIG. 5 illustrates an example reproduction of the hand-drawn circuit of FIG. 4, the exemplary reproduced schematic of FIG. 5 is generated using a conventional schematic generator.
Figure 6:
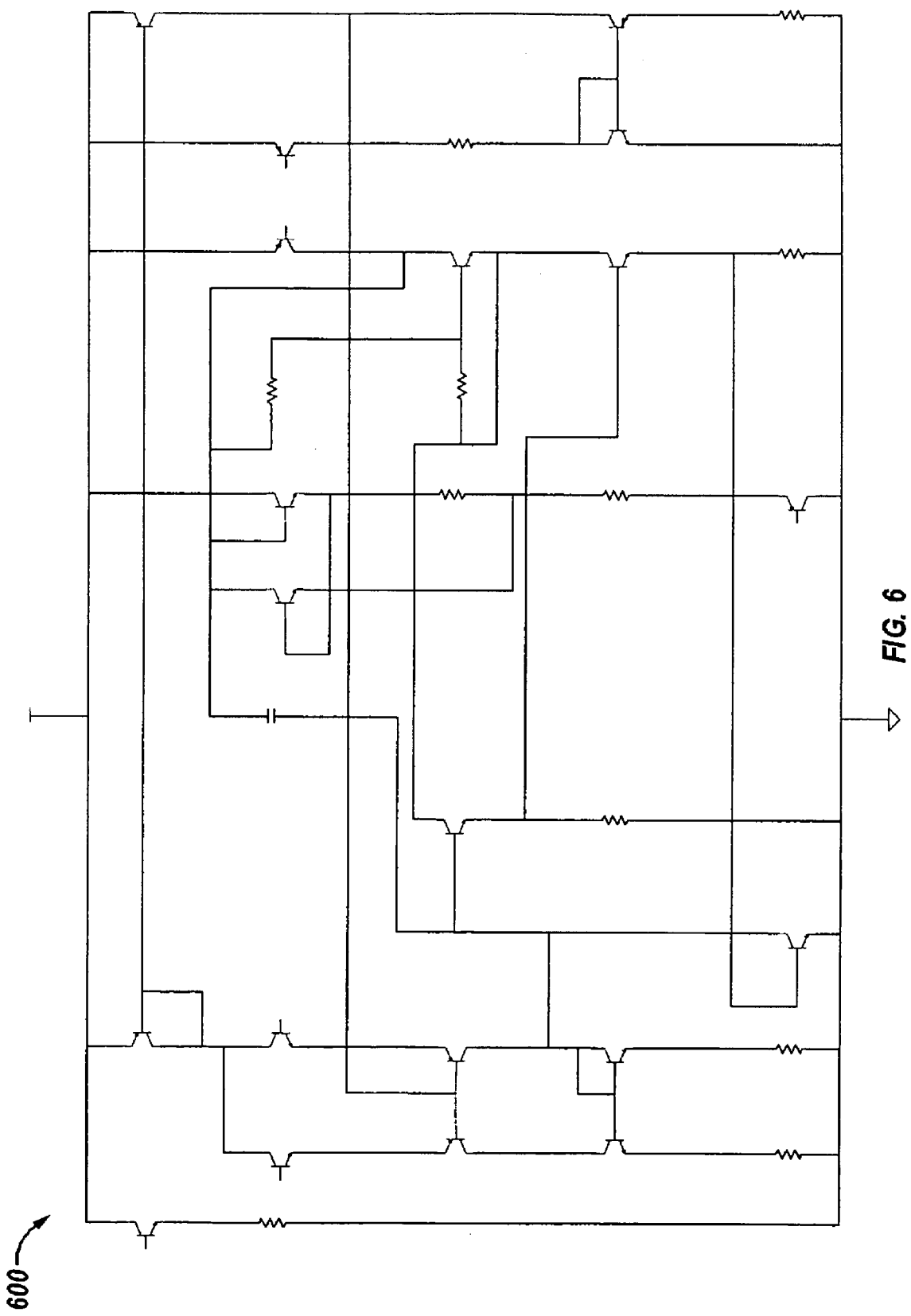
FIG. 6 illustrates an example reproduction of the hand-drawn circuit of FIG. 3, the exemplary reproduced schematic of FIG. 6 is generated using the schematic generator shown in FIG. 3.

FIGS. 4-6 are schematics of one or more single circuit netlists. As shown in FIG. 4, schematic 400 is hand-drawn. FIG. 5 is an example circuit schematic 500 generated by a conventional CAD application using a conventional schematic generator. FIG. 6 is an example circuit schematic 600 generated by a CAD application using automatic schematic generator 300. Although, visually, FIGS. 4-6 look different from each other, they are the same circuit representation of a common circuit layout. As shown from FIGS. 5 and 6, schematic 600 has better resolution than schematic 500. The individual transistor in schematic 600 is much easier to identify than in schematic 500. The connections of wires in schematic 600 are also clearer and easier to follow than the wires of schematic 500. Overall, schematic 600 is easier to interpret and comprehend than schematic 500.

To generate schematic 600, on a high level, automatic schematic generator 300 can be configured to employ one or more of the modules shown in FIG. 3. These can be configured to, for example, parse the netlist, interpret and map connectivity data, identify and resolve templates, integrate external data inputs, and generate the final circuit schematic data. Before automatic schematic generator 300 begins construction of schematic 400 from data in one or more of netlists 350a-c, data from netlists 350a-c in one embodiment is first extracted and deciphered using netlist parser 305. Because netlists come in variety of formats, in one embodiment netlist parser 305 is configured to be compatible with various netlist formats such as SPICE and CDL for example.

Connectivity data extracted from netlists 305a-c may be stored in a memory (not shown) or on connectivity database 310, or both. On a high level, automatic schematic generator 300 can be configured to use the stored connectivity data to generate schematic 600. Netlist parser 305 may also forward the connectivity data to other flow applications such as a connectivity-driven layout for which a fully placed and routed schematic is not required.

In a preferred embodiment, parser 305 is configured to output data such that is compatible with the OpenAccess standard. Alternative embodiments can output data compatible with other standards such as EDIF. Parser 305 outputs data into common connectivity database 310. In an embodiment, connectivity database 310 is an OpenAccess connectivity database. Output data of parser 305 includes description of circuit elements of schematic 400 and their relative connectivity data. For example, parser 305 defines a circuit element as a certain type of instance having a certain number of ports, pins, and power rails, etc. Additionally, parser 305 describes the connectivity data for the instance in question by defining what type of device, external port, or power rail that may be connected to it.

In one embodiment, database 310 is a connectivity-only database; therefore parser 305 only describes each circuit element's connection. At this point, parser 305 does not have placement and routing data. On a high level, database 310 contains data that sufficiently capture the mathematical description of what is electrically connected to what.

In another embodiment, template database 320 and template module 325, together, help identify some of the circuit elements in schematic 400. Specifically, template module 325 attempts to classify each circuit element of schematic 400 by comparing each element against stored templates in database 320. In this way, template module 325 may for example classify a circuit element as an instance because it matches with a certain template stored in database 320.

In another embodiment of the automatic schematic generator 300, a user may input one or more user-specified templates via I/O module 315. The user-specified templates may be stored in template database 320. User-specified templates allow automatic schematic generator 300 to be flexible by incorporating external templates with templates already existed in database 320. Additionally, user-specified templates allow further extensibility of the system by defining circuit templates from analog building blocks not already built-into the system. User-specified templates may allow, for example, automatic schematic generator 300 to specify connectivity, related placement and orientation, and augmentation information for circuit blocks such as current mirror and Darlington pair, etc.

As mentioned, in one embodiment, automatic schematic generator 300 allows the user to create her own templates that would add to or replace built-in templates. In addition to specifying connectivity, augmentation, and placement information, topology extractor 340 can be implemented such that the user may also specify some or all of the following information as topology specification:

1. Name of the topology. This is a named identifier of the topology.
2. Pair of master device names constituting this topology (Possible options arc NMOS, PMOS, NTX, PTX). Example {NMOS, NMOS}, {NTX, PTX}.
3. Terminal (node) pairs, each of which must be connected to a common net. At present a maximum of four node pairs are allowed. In general first node belongs to instance of first master device and second node belongs to instance of second master. Kach node pair specifies following attributes:
   3.1. Name of node1 corresponding to first instance
   3.2. Name of node2 corresponding to second instance
   3.3. Boolean attribute specifying whether for the given node pair the multiple connections are allowed or not.
   3.4. Boolean attribute specifying whether the second port also belong to the first instance. This can not be set true for first node pair.
4. An integer specifying the number of node pairs specified.
5. The quadrant in which the two instances satisfying 3.2 & 3.3 should be placed. Each quadrant is identified as I, II, III and IV.
6. The initial orientation of the pair of instances. Possible options are ZERO, FLIPY, FLIPX, FLIP__90, FLIP__180, FLIP__270.
7. For each topology an augment direction is specified. This specifies, in which direction the pair of instances be augmented. Possible options are, NONE, HORIZONTAL, VERTICAL, DIAGONAL.
   7.1. NONE is specified if no augmentation is to be done.
   7.2. HORIZONTAL is specified for series connected topologies.
   7.3. VERTICAL is specified for Differential Pair kind of topologies. If the top port of the instance pair is connected to common net, then augmentation is done downwards. If the bottom port of the instance pair is connected to common net, then augmentation is done upwards.
   7.4. DIAGONAL is specified for Darington Pair kind of topologies.

An example of a topology specification for an inverter is:

```
{
"Inverter 1",
    {PMOS,NMOS},
    {
        { "G", "G", TRUE , FALSE },
        { "D", "D", TRUE , FALSE },
    },
    2,
    { II, III },
    { ZERO, ZERO },
    NONE
}.
```

In the above example algorithm, two instances are located in which: 1) a master of first instance is a PMOS master and master of second instance is an NMOS master. 2) a 'G' terminal of first instance and a 'G' terminal of second instance are connected to common net. There could be other instances connected to this common net.

Figure 7A:
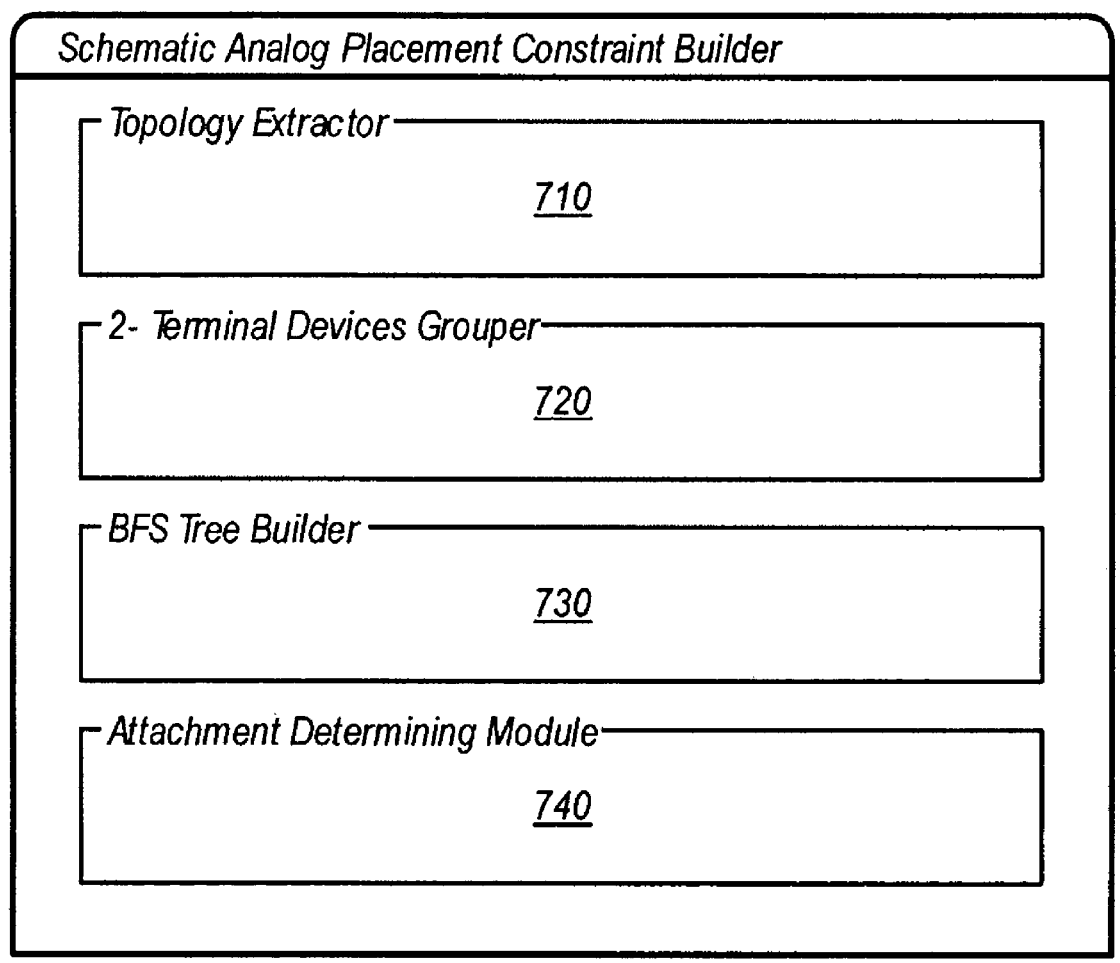
FIG. 7A illustrates a schematic analog placement constraint builder according to one embodiment of the present invention.
Figure 7B:
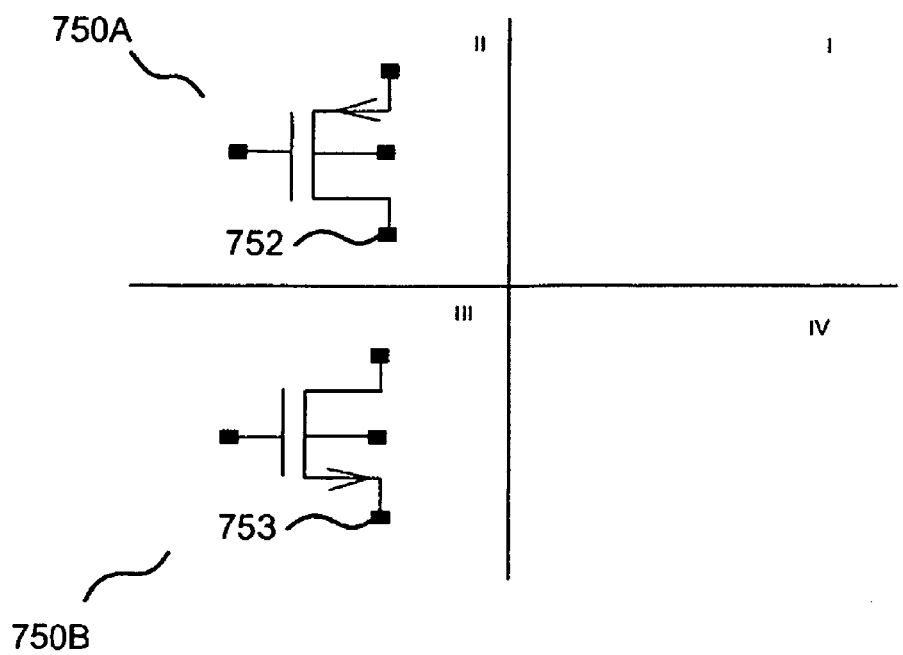
FIGS. 7B-C illustrate example grid-based placement schematics according to embodiments of the present invention.

FIG. 7B is a layout grid according to one embodiment of the present invention. Referring now to FIG. 7B, a 'D' terminal 752 of a first instance 750a and a 'D' terminal 753 of a second instance 750b are connected to common net. There could be other instances connected to this common net. In one embodiment, first instance 750a is placed in quadrant II and second instance 750b is placed in quadrant III. Each of the instances shown has ZERO orientation, therefore it does not need to be augmented.

An example of a topology specification for a differential pair is:

```
{
"Differntial Pair 3",
    { NMOS,NMOS },
    {
        { "S", "S", TRUE , FALSE },
        { "G", "G", TRUE , FALSE },
    },
    2,
    { II, I },
    { ZERO, FLIPY },
    VERTICAL
}
```

In the above example algorithm, two instances are located in which: 1) a master of first instance is a NMOS master and a master of second instance is an NMOS master. 2) a 'S' terminal of first instance and a 'S' terminal of second instance are connected to common net. There could be other instances connected to this common net.

Figure 7C:
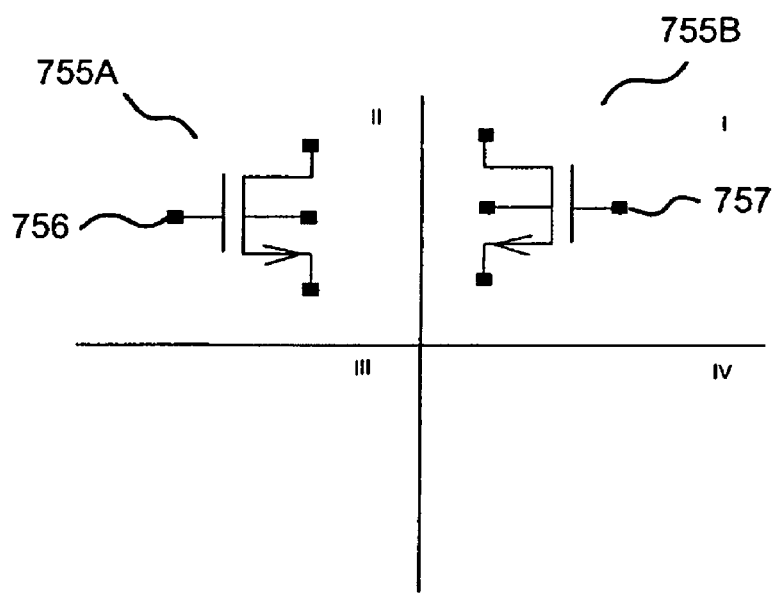

FIG. 7C is a layout grid according to one embodiment of the present invention. Referring now to FIG. 7C, a 'G' terminal 756 of a first instance 755a and a 'G' terminal 757 of a second instance 755b are connected to common net. There could be other instances connected to this common net. In one embodiment, first instance 755a is placed in quadrant II and second instance 755b is placed in quadrant I. First instance 755a can have ZERO orientation and second instance can have a FLIPY orientation. Once found, it should be augmented vertically upwards.

The connectivity information in the built-in and user-specified templates, in one embodiment, allows a pattern-matching algorithm of automatic schematic generator 300 to match instances of the template that occur in the connectivity database. The placement/orientation information specified in the template offers hints/guidance to the placement engine when these instances are placed in the final schematic. The augmentation information can also be used during the final schematic generation stage to handle extended patterns. As mentioned, the system can be implemented such the user can choose to override the built-in templates by providing user-supplied templates that match the same topology. In one embodiment, automatic schematic generator 300 can be implemented to automatically resolve any existing conflicts between the user-supplied and built-in templates. In an embodiment, user-supplied templates trump built-in templates if there is a conflict between the two templates. Alternatively, built-in templates trump user-supplied templates.

Further, automatic schematic generator 300 allows a user to specify primitive or basic devices such as, for example, NMOS, PMOS, NTX, or PTX in a given circuit schematic. Additionally, the user can define connection properties to control how those devices are connected to each other. One example of a connection property is a definition that defines the gates of two devices being connected to a common net.

The placement information in the user-specified template can be provided to allow the user to specify how these primitive devices are to be placed relative to each other in the final schematic. For example, the user may specify how transistors are placed in a current mirror. The user may define that transistors are to be aligned horizontally and back to back, and for differential pair they are to be aligned horizontally and face-to-face. For a non-analog but still relevant example, a MOS inverter circuit would typically place the NMOS transistor directly below the PMOS transistor with both gates facing the same direction. Such relative placements and orientations are well understood by those skilled in the art of electronic circuit design.

The augmentation information in the user-specified template can be provided to describe which directions a basic two-device circuit template can be further augmented or extended by automatic schematic generator 300. Augmentation is the process of appending a circuit instance with other or similar instances placed in a similar manner to extend the pattern. For example, a two-transistor Darlington pair is typically laid out with one transistor diagonally below the other. Through augmentation, a three-transistor Darlington triplet can be created by extending the two-transistor Darlington pair by diagonally placing the third transistor below the first two. Likewise, a fourth Darlington transistor can be diagonally placed below the third. This process may be repeated to any arbitrary degree and direction.

Generally, in an augmentation process, an NMOS differential pair is typically augmented upwards. Further face-to-face or back-to-back transistors are typically placed directly above the differential pair, and so on. A PMOS differential pair is typically augmented downward.

In an embodiment, automatic schematic generator 300 allows the user to specify which circuit model (e.g., SPICE or other textual subcircuit such as "nmos_hvt12") automatic schematic generator's 300 pattern matching algorithm should use to correspond the model with the circuit primitive devices such as NMOS transistors, PMOS transistors, NTX bipolar transistors, and resistors. This allows the pattern-matching algorithm of automatic schematic generator 300 to work with a variety of processes and device models. Complementary device pairs (e.g. NMOS, PMOS) can also be identified using this mechanism, and this information can be used later by the template/pattern matching algorithm of automatic schematic generator 300 to identify common analog building blocks.

2.1 Automatic Schematic Generator Algorithm Process Flow

In one embodiment, automatic schematic generator 300 can be implemented to include algorithms to receive various inputs and produce a fully placed and routed schematic using a two pass technique. In the first pass, automatic schematic generator 300 defines placement constraints of analog circuit elements using an schematic analog placement constraint builder (SAPCB). In the second phase, automatic schematic generator 300, placement and routing modules use the results of the constraints defined by the SAPCB to produce a fully placed and routed schematic database.

FIG. 7A illustrates the general architecture of an analog placement constraint builder 700 according to an embodiment of the present invention. Referring now to FIG. 7A, in one embodiment, analog placement constraint builder 700 is an integrated software module of a CAD application. Alternatively, analog placement constraint builder 700 is a standalone application that can be executed on a local computer system or on a remote server. In the example shown in FIG.

7A, analog placement constraint builder 700 includes a topology extractor 710, a 2-Terminal devices grouper 720, a breadth-first search (BFS) tree builder 730, and an attachment determining module 740. The roles and functionalities of each of these components will be discussed below.

Figure 8:
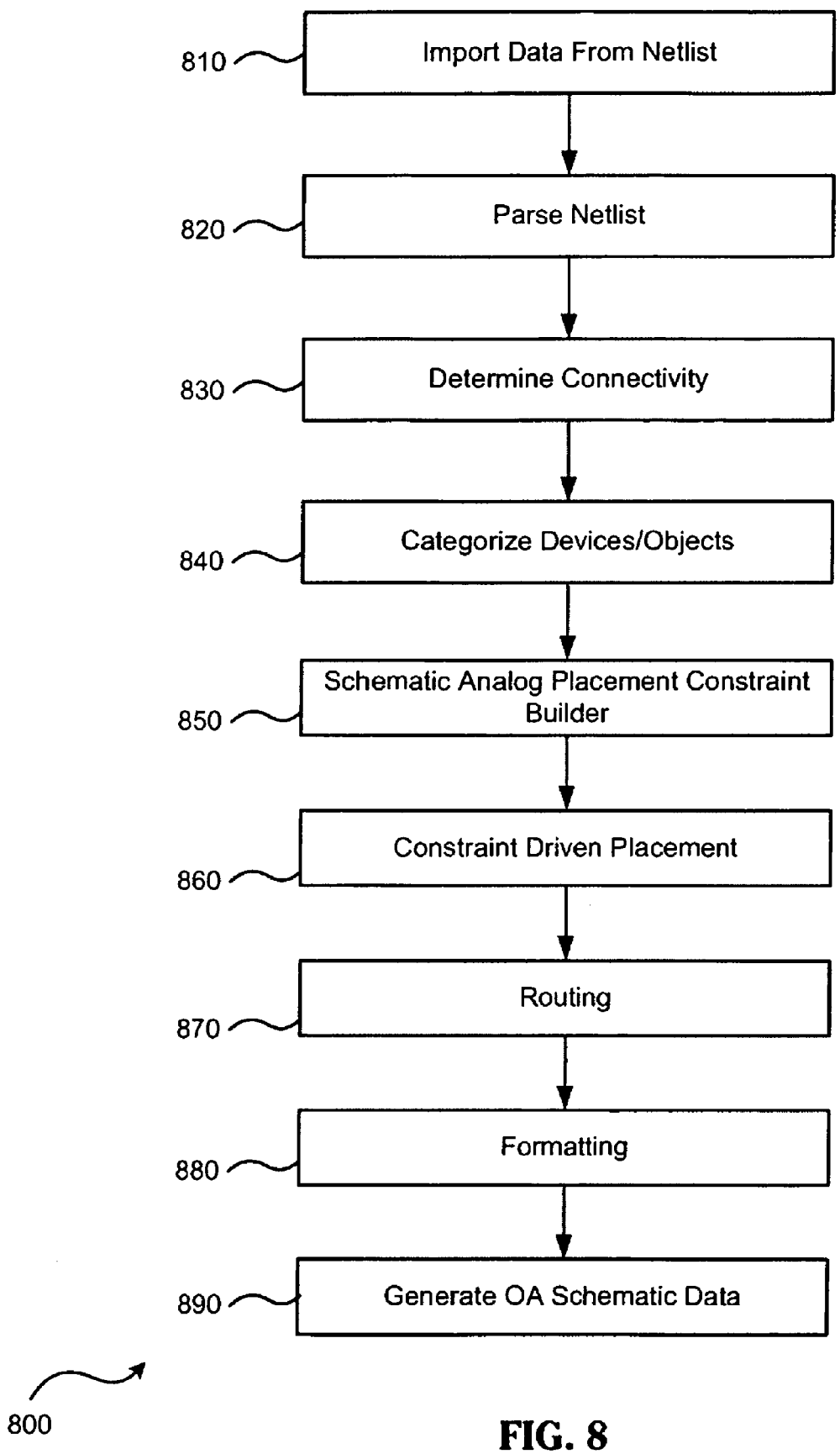
FIG. 8-10 illustrate example process flows implemented by the schematic generator of FIG. 3 in accordance to embodiments of the present invention.

FIG. 8 illustrates a method 800 implemented by automatic schematic generator 300 to generate circuit schematics similar to schematics 200 and 600 according to an embodiment of the present invention. Method 800 in the illustrated example starts at operation 810 where automatic schematic generator 300 imports data from one or more of netlists such as netlists 350*a-c*. As mentioned, netlists 350*a-c* may come in a variety of formats such as SPICE, CDL, Spectre, Verilog-A, or other suitable format. Automatic schematic generator 300 is configured to simultaneously work with netlists of different formats.

In operation 820, automatic schematic generator 300 uses a parsing module or parser 305 to extract connectivity data from one or more of the netlists. Output data of parser 305 is an intermediate representation of textual circuit connectivity. Parser 305 stores its output data in common connectivity database 310 or in a memory or other suitable storage devices. The connectivity database 310 is an intermediate database, which stores the binary/AST representation of the textual circuit connectivity.

Output data of parser 305 includes description of circuit elements and their connection data. For example, parser 305 defines a circuit element as a certain type of instance having a certain amount of ports, pins, and power rails. Additionally, parser 305 also defines what type of device, external port, or power rail that may be connected to it. In this way, in operation 830, automatic schematic generator 300 is able to determine the connectivity data for each circuit element in the netlist.

In determining the connectivity data of operation 830, automatic schematic generator 300 adopts several assumptions of MOS and Bipolar devices. For MOS devices, any four terminal device having terminals 'D','G','S' & 'B' such that 'D' on top and 'S' on bottom, is considered as PMOS device and one having 'S' on top and 'D' on bottom, is considered as NMOS device. For bipolar devices, any three terminal device having terminals 'E','C' & 'B' such that 'E' on top and 'C' on bottom, is considered as NPN device and one having 'C' on top and 'E' on bottom, is considered as PNP device. For each of the above device, there must be at-most one terminal each in a particular direction. For three terminal device, the number of pins in one of the left or right direction must be zero.

Any instance belonging to any of the above categories, is termed as a tree instance. The port/terminal of an instance which appears on top boundary of the instance master is referred as top port/terminal. Similarly, port/terminal of an instance which appears on the bottom, left, and right boundary of the instance master is referred to as bottom port/terminal, left port/terminal, and right port/terminal, respectively.

In one embodiment, in operation 830, automatic schematic generator 300 uses template module 325 to analyze the connectivity data in the memory or in connectivity database 320 and search for predefined circuit patterns or templates. Predefined or built-in templates are stored in template database 320. In this operation, automatic schematic generator 300 classifies one or more circuit elements into a category or class of circuit by comparing the circuit element or a collection of circuit elements against stored templates in database 320. Automatic schematic generator 300 may for example classify a circuit element or a collection of elements as an instance because it matches with a certain template in database 320.

Automatic schematic generator 300 can also integrates user-specified templates with built-in templates. Prior to integrating user-specified templates with built-in templates, automatic schematic generator 300 checks for conflicts. In an embodiment, the user-specified template trumps the built-in template. Alternatively, the built-in template is controlling. The connectivity information in the user-specified template allows a pattern-matching algorithm of automatic schematic generator 300 to match instances of the template that occur in the connectivity database. Using the user-specified template, the user may also define I/O ports, ground and power pins, connectivity, placement and orientation, and augmentation information of circuit elements.

In operation 840, automatic schematic generator 300 categorizes the various devices/objects in the connectivity database into major groups. For example, in the illustrated process these are comprised of "primitive" devices such as MOS and BJT transistors, two-terminal devices (such as resistors, capacitors, etc), and multi-terminal devices.

In operation 850, Schematic Analog Placement Constraint Builder (SAPCB) 700 is called upon to generate various placement, routing, and formatting constraints. In one embodiment, builder 700 identifies various placement constraints using topology extractor 710, group 2-terminal instances using module or grouper 720, create a breadth first search tree using BFS tree creator 730, and determine attachments using module 740 based on the constraints produced by components 710-730. These placement constraints, groupings, and the BFS tree will then be used to perform the final placement.

In operation 850, instances are identified using connectivity data from database 310 and data from the built-in and user-specified templates. Examples data from database 310 are connectivity data, augmentation data, and placement/orientation data. Connectivity data allow a pattern-matching algorithm of automatic schematic generator 300 to match instances of the template that occur in the connectivity database. Placement/orientation data determine where these instances are placed in the final schematic. Augmentation data are used during the final schematic generation stage to handle extended patterns. In one embodiment, connectivity data, augmentation data, and placement/orientation data are created using topology extractor 710.

Figure 9:
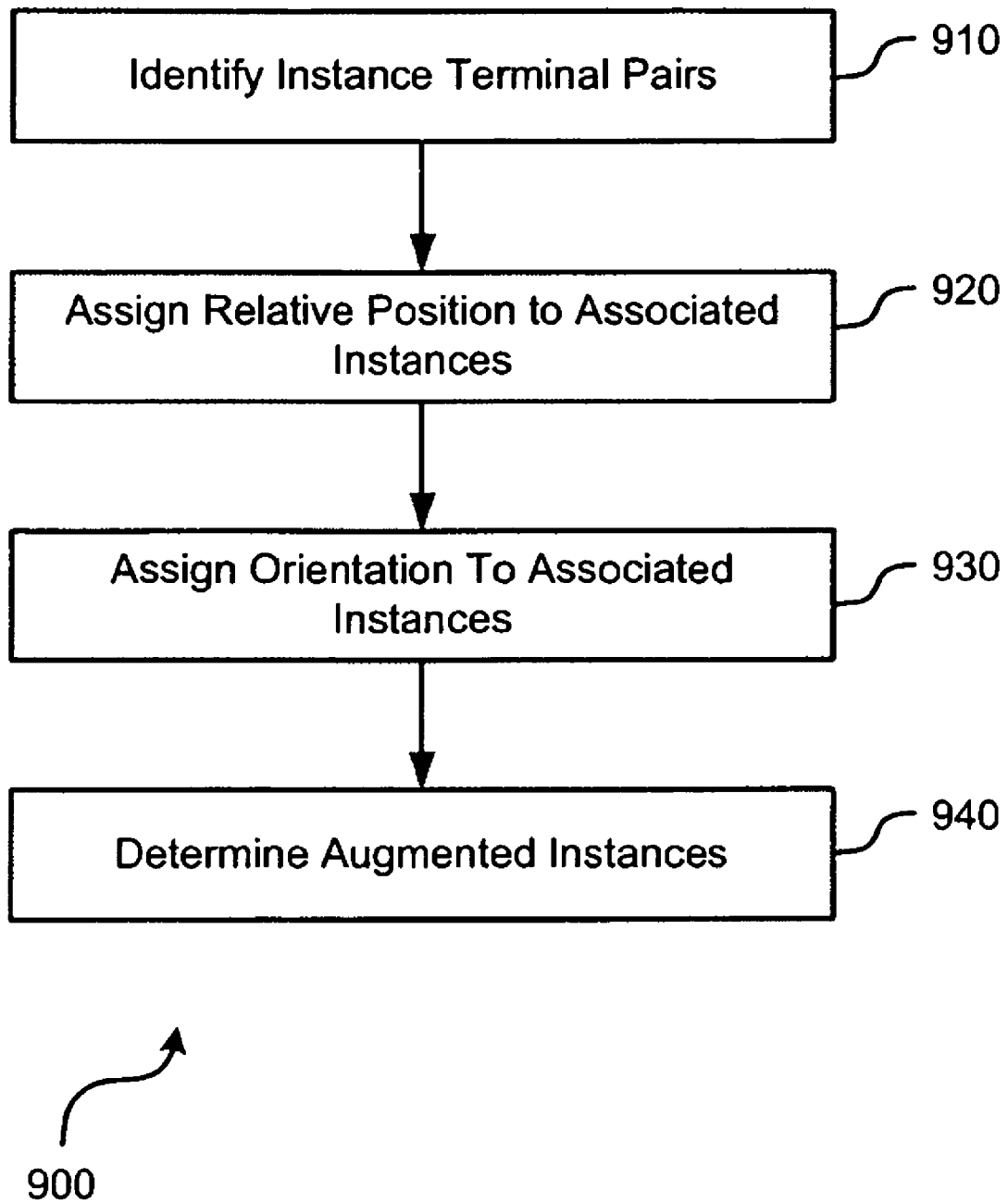

To help illustrate the topology extraction process performed by topology extractor 710, let us now refer to FIG. 9. FIG. 9 illustrates a process flow 900 implemented by topology extractor 710 according to one embodiment of the present invention. In an operation 910, pairs of instance terminal or node are specified. In one embodiment, a maximum of four node pairs are specified. Each node pair is specified using the following attributes: name of node 1 corresponding to the first instance; name of node 2 corresponding to the second instance; Boolean attribute specifying whether for the given node pair the multiple connections are allowed or not; and Boolean attribute specifying whether the second port also belong to the first instance; the number of node pairs specified.

In an operation 920, once the node pairs are identified, the relative position of associated pair of instances are identified, which is specified in terms of quadrants. In one embodiment, there are a total of four quadrants-I, II, III, and IV. In one embodiment, the instances associated to node pair are assigned to one of the four quadrants based on two criteria: 1) whether the instance pair is a pair combination of NMOS, PMOS, NTX, and PTX (e.g, NMOS-PMOS pair, NTX-PTX pair, or PMOS-PMOS pair); and 2) the node pair matches the specification in operation 910.

In an operation 930, an orientation information for the instances is specified. In one embodiment, the orientation information comprises: ZERO, meaning no flip; FLIPY, flip along the y-axis; FLIPX, flip along the x-asis; FLIP_90, flip 90 degrees; FLIP_180, flip 180 degrees; FLIP_270, flip 270 degrees.

In an operation 940, augmentation direction for the terminal pair is determined. A terminal pair can be augmented horizontally, vertically, and diagonally. Horizontal augmentation is specified for series connected topologies. For example, to determine whether a pair is to be horizontally augmented, in one embodiment, a netlist or a connectivity database (e.g. OpenAccess connectivity database) is searched for any instances that are connected to the left or right of the terminal pair. If such instances are found, the terminal pair is then augmented and expanded to include such instances.

Vertical augmentation is specified for differential pair kind of topologies. For example, if the top port of the instance pair is connected to common net, then augmentation is done downwards. As another example, if the bottom port of the instance pair is connected to common net, then augmentation is done upwards. The augmentation terminates if the top/bottom port hit the global net or they hit some common net or if the pair of instances are not found. Initially only one pair of instances are clustered for this topology such as, for example, a transistor pair M1 and M2. M1 can be placed in quadrant II and M2 is placed in quadrant I, for example. In one embodiment, a netlist or a connectivity database is probed for connected instances such that the connected instances bottom ports connect to the top ports of M1 and M2. If such instances are found, then the M1 and M2 pair is augmented and expanded to include such instances.

Diagonal augmentation is specified for Darlington Pair kind of topology. For example, let us assume that initially only one pair of instances are clustered for this topology such as, for example, M1 and M2. In this illustrated example, M1 is placed in quadrant II and M2 is placed in quadrant IV. Thus, M1 is probed for connected instances such that the connected instance and M1 form a Darlington pair. Probe in this context, means a netlist or a connectivity database is searched for instances similar to M1 that is connected to M1. Similarly, M2 is probed for connected instances such that M2 and the connected instance form a Darlington pair.

Figure 16:
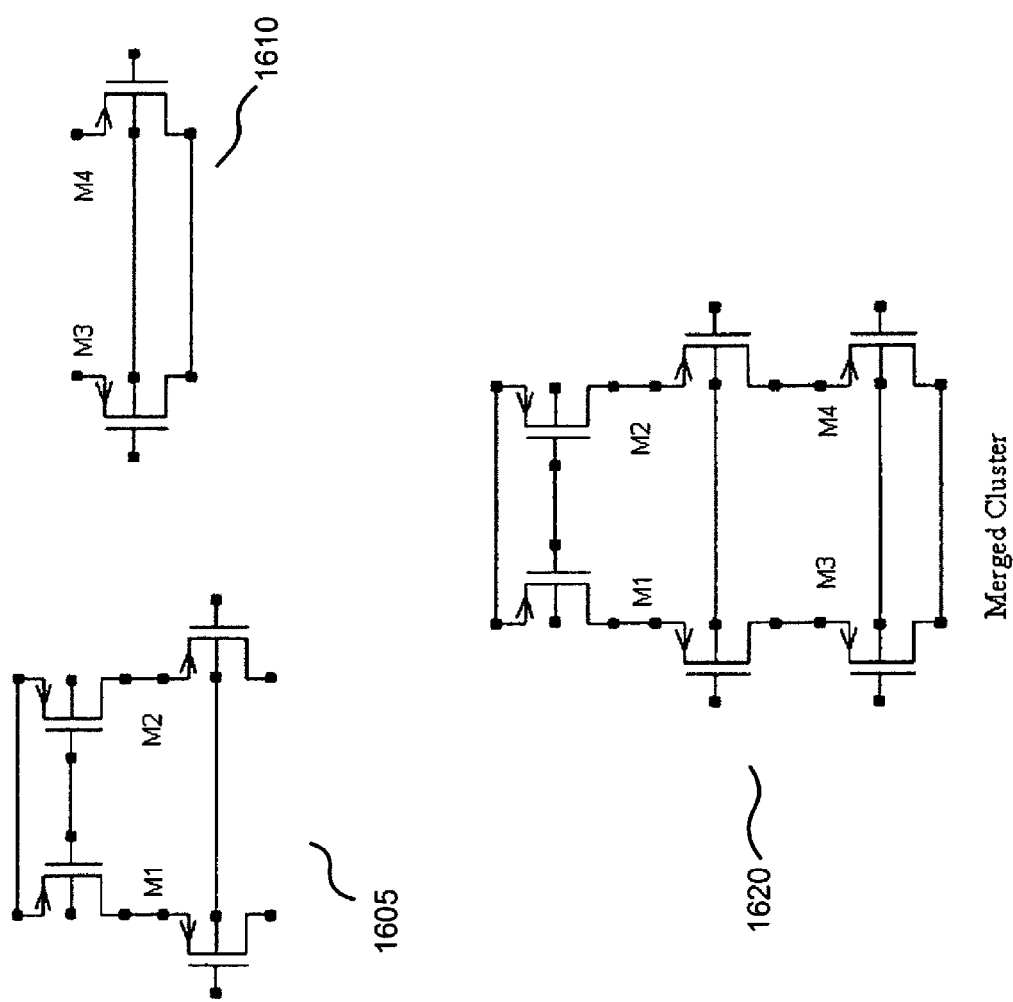
FIG. 16 illustrates a block diagram of merged topologies according to an embodiment of the present invention.

In one embodiment, once topology extractor 710 extracts all of the topology clusters, the topology clusters are merged to further enhance the readability of finally generated schematic, see FIG. 16 for an example illustration. Cluster 1 and cluster 2 are two clusters identified by topology extractor. If the bottom ports of M1 and M2 instances are connected to same nets to which the top ports of instances M3 and M4 are connected, then the cluster 1 and cluster 2 are merged to create a bigger cluster. After merging is done, both cluster 1 and cluster 2 are removed from cluster list and the merged cluster is added to the cluster list. The merging is done repeatedly and it stops when none of the cluster could be merged.

Referring again to operation 850 in FIG. 8, clusters of two-terminal device instances are created using, in one embodiment, 2-terminal devices module or grouper 720. These instances do not match with any of the built-in or user-defined templates. A two terminal device is defined for this section as a device with ports in opposite direction. That is, if a device has one port on left and the other port on top side, then it is not a valid two terminal device for RC or SPC (Series Parallel Clustering) clustering purposes. A general logic of left to right connectivity can be used for all non-tree and two terminal instances such as resistors, capacitors, diodes, current sources, etc. Generally, non-tree instances are instances that do not belong to the group of tree instances which consist of PMOS, NMOS, PTX, and NTX.

Two terminal instances are likely to be randomly placed because of their master port orientation. In order to reduce complexity, in one embodiment, automatic schematic generator 300 clusters two terminals devices into two groups: RC and series-parallel (SPC).

The RC clustering algorithm of automatic schematic generator 300 in one embodiment looks for specific instances of a common analog topology such as a series connected chain of a pair of two-terminal instances with the one end of the chain being connected to a ground. An example of such common analog topology is a resistor-capacitor terminating pair. In this case, the placement and orientation of the resistor-capacitor terminating pair can be sketched such that the resistor is shown horizontally and the capacitor vertically.

Figure 12:
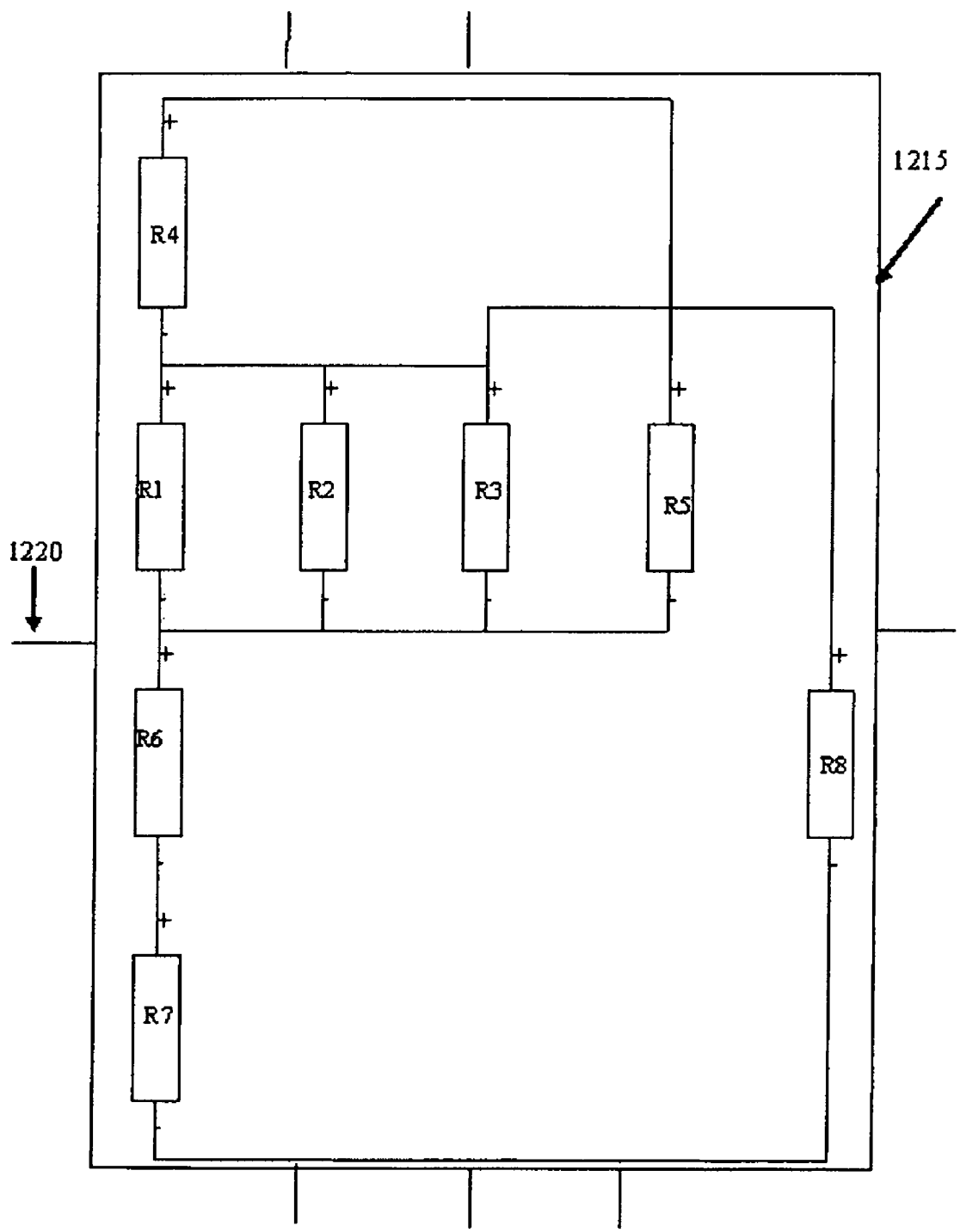
FIG. 12 illustrates an example block diagram produced by clustering method according to an embodiment of the present invention.

In one embodiment, the series-parallel clustering algorithm of automatic schematic generator 300 recursively identifies series and parallel-connected, two-terminal devices, and arranges them into a cluster. FIG. 12 is a diagram illustrating an example series-parallel cluster generated by the SPC clustering algorithm according to an embodiment of the present invention.

Referring now to FIG. 12, a cluster is generated recursively identifying and arranging series-connected & parallel-connected two-terminal devices. Find a valid two terminal instance, R1. Find port1, which is either on left or top side of the master. Find port2, which is either on right or bottom side of the master. Find another two terminal device such that one of its port connects to net connected to port1 and other port is connected to net connected to port2. Place this instance (R2) parallel to R1. Repeat this process until no more parallel instance could be found. FIG. 12, R1 R2 and R3 are identified as instances connected in parallel. Then find a two terminal instance which is connected in series to port1 of R1. That is, R4. Then consider the left or bottom port of R1 and right or top port of R4. Find instance connected in parallel to these ports, that is R5. Repeat this process recursively to get the complete cluster. Each of the instance added in SPC cluster is assigned a relative row and column. For placement, automatic schematic generator 300 uses the same overall placement grid as used for the basic analog building blocks described earlier.

Once the two clusters are created, all the instances that are part of a cluster are removed from global instance list, along with their net connection information. Further, for each cluster removed, a dummy instance 1215 is created and inserted in the global instance list. In one embodiment, automatic schematic generator 300 also creates dummy ports 1220 for dummy instance 1215 for each net connection that connects to any instance outside of the cluster. Net connections of dummy ports 1220 are also inserted in global net connection list.

Referring again to FIG. 8, in operation 850, automatic schematic generator 300 determines the appropriate orientation of every two terminal instance in the global instance list. Automatic schematic generator 300 orientates the two-terminal instances with respect to analog design intent. At this stage, a two terminal instance could be, for example, a cluster of two terminal instances having two connections coming out of the cluster or an un clustered two terminal instance.

As previously mentioned, a breadth-first search tree is created using, in one embodiment, BFS Tree Builder 730 of FIG. 7. The BFS tree is created using all tree instances (e.g., primitive analog devices) such as, for example, NMOS, PMOS, NTX, PTX found and identified by the previous two operations (830 and 840). The tree could be, for example, a mix of both MOS and TX devices identifying parent-child (i.e. relative vertical position) relationship among various analog devices. On a high level, the BFS tree is created by first populating the BFS tree with only tree instances starting from power net and then expanding the tree in BFS manner until the net connecting to the bottom port of tree instances is connected to the ground net. The BFS tree is created to obtain the vertical alignment of tree instances, which helps make the final analog schematic more humanly understandable and interpretable.

Figure 10:
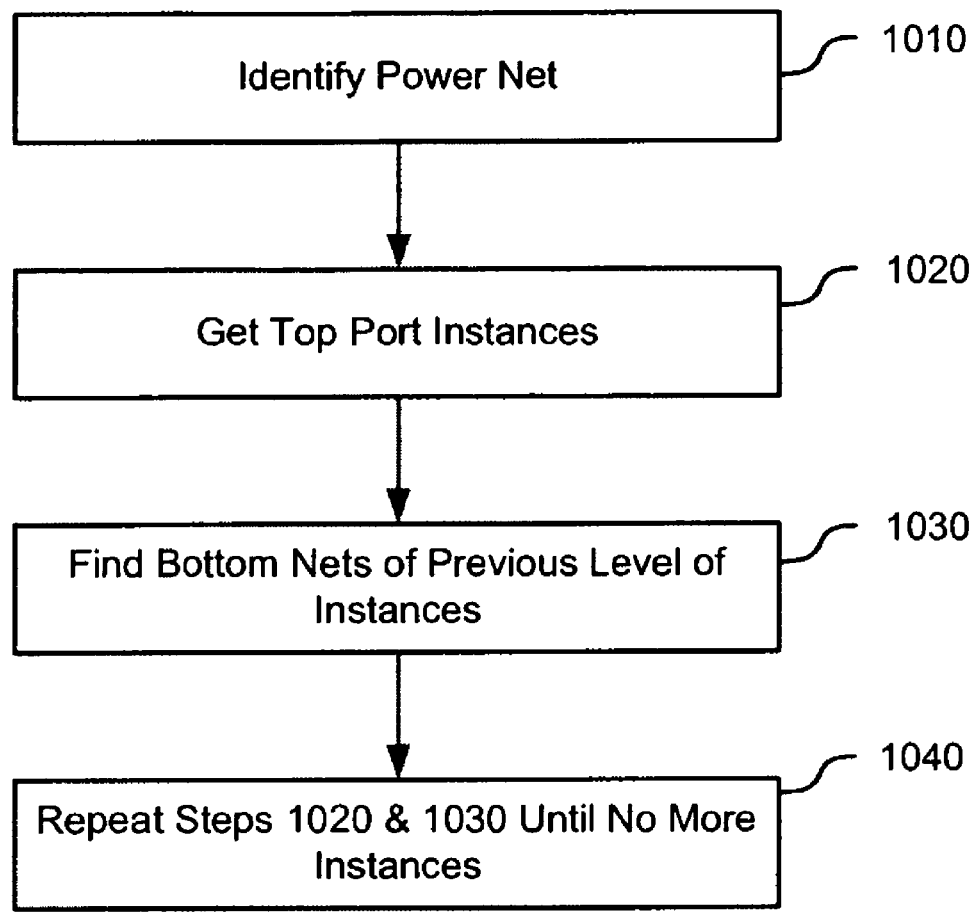

To help illustrate the BFS tree creation process performed by BFS tree creator 730, let us now refer to FIG. 10. FIG. 10 illustrates an example process flow for generating a BFS tree in according to one embodiment of the present invention. Referring now to FIG. 10, in operation 1010, one or more power nets are identified. In one embodiment, the power net is located and in operation 1020, a "get top port" command is executed to create a list of tree instances whose top ports are connected to the power net. This list of tree instances are then used in an operation 1030 below.

In operation 1030, find the next level of instances whose top ports are connected to the bottom ports of instances identified in the previous level of the BFS tree. In one embodiment, instances to be found for BFS tree can be located in connectivity database populated by net list parser 305.

In operation 1040, repeat operation 1020 & operation 1030 until no more tree instances are found to be connected to the bottom port of leaf instances of BFS tree or the bottom port of leaf instance is connected to the ground net. Similarly, in one embodiment, definitions of these nets can be found in a connectivity database such as, for example, an OpenAccess database.

Figure 17:
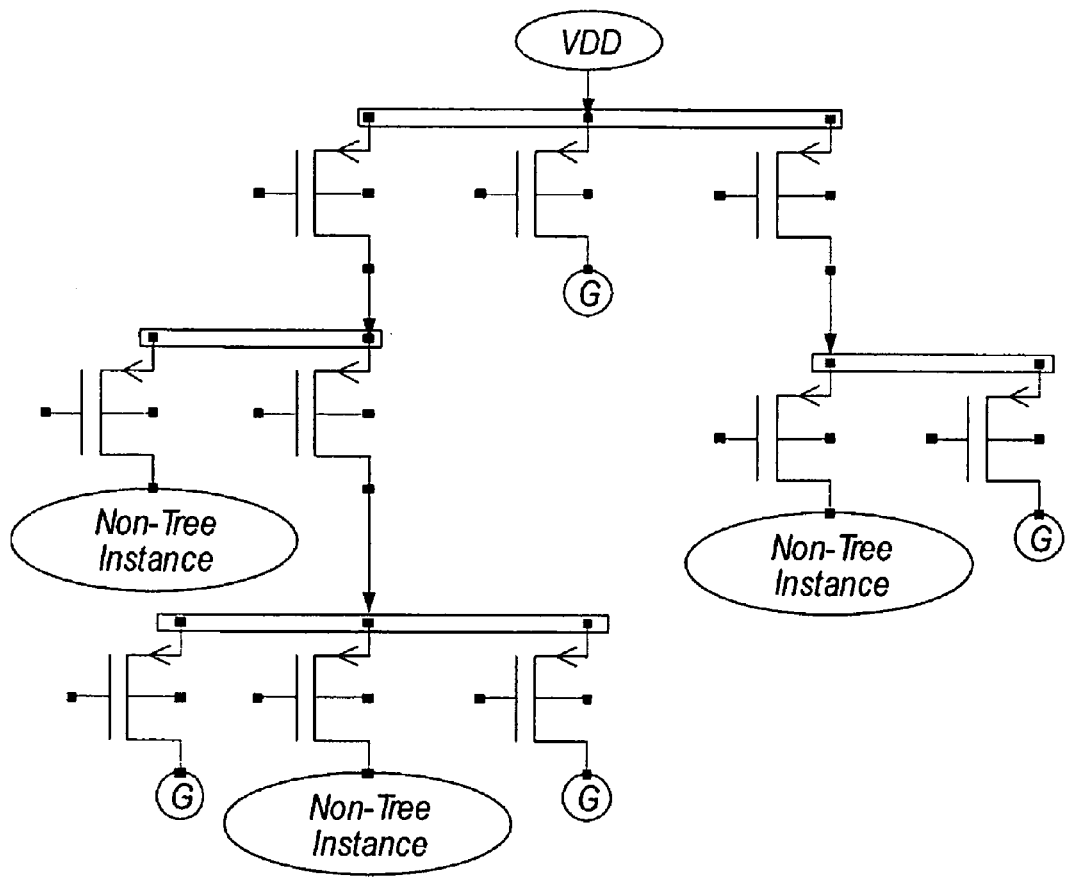
FIG. 17 illustrates a block diagram of a breadth-first search (BFS) tree according to an embodiment of the present invention.

Once a preliminary BFS tree is created, each child instance is moved to the lowest possible tree level. An example illustration of a BFS tree according to an embodiment of the present invention is illustrated in FIG. 17A. In this scenario, a child instance is an instance with its top port being connected to a bottom port of another instance. An instance can be a child instance of another child instance, which can be a child instance of a parent instance. It is possible that the top port of an instance is connected to a net that appears as a bottom port net at two different levels of the BFS tree. In such cases, the BFS tree algorithm separates the tree branch from the main BFS tree that corresponds to any such instance from higher level of the BFS tree and stitches it to the lowest level of the BFS tree instance. In this way, the top to bottom alignment of tree instances is created. It should be noted that automatic schematic generator 300 can create multiple trees, referred to as a forest, and define interconnections between each tree.

Figure 18:
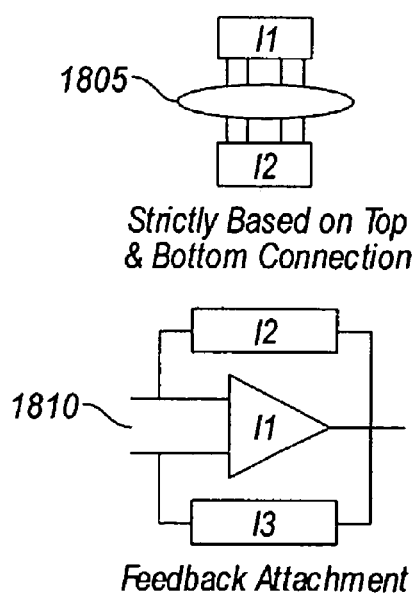
FIG. 18 illustrates examples of terminal instances according to an embodiment of the present invention.

Still further in operation 850, automatic schematic generator 300 determines relative attachments/alignments in top and bottom directions using attachment determining module 740. Automatic schematic generator 300 performs this operation while also taking into account the instances of the devices corresponding to the basic analog building block found in built-in or user-specified templates, mega-clusters, and any remaining multi-terminal devices. In one embodiment, relative attachments/alignments (placement) of instances are determined by analyzing the ports connection of the instances. For example, given a first and a second instance, the first instance and second instance are said to be a top and bottom attachments, respectively, if the bottom ports of the first instance are connected to some nets and the top ports of the second instance are connected to the same nets (see for example, instances 1805 of FIG. 18). Relative placement of black box instances are also determined in this operation by analyzing ports connection of the black box instances with respect to two-terminal instances connected to them (see for example, instances 1810 of FIG. 18). Black box instances are any instances that are non-tree instances and non-two-terminal instances. The attachments are added recursively in top and bottom direction for all the instances.

Figure 11A:
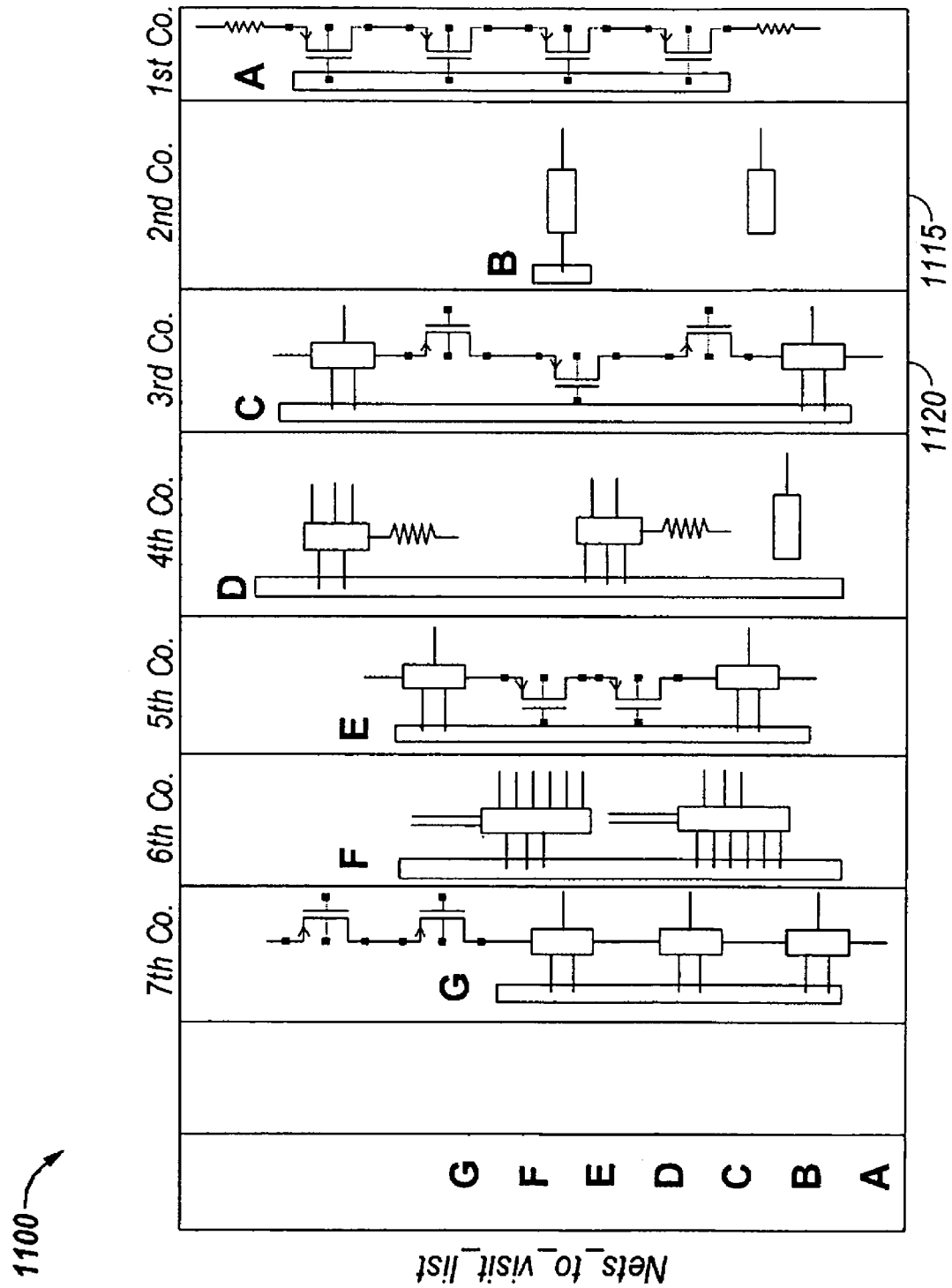
FIGS. 11A-C illustrate a block diagram of example grid-based placement schematics according to embodiments of the present invention.

The placement process in operation 860 is grid based. To help illustrate, let us refer to a grid 1100 of FIG. 11A. Referring now to FIG. 11A, grid 1100 has columns populated with circuit components which are later assign rows. In one embodiment, a first column 1110 of grid 1 100 is populated with instances from one of the following source: 1) a BFS tree branch having the most number of left connections or nodes; 2) topology instances with the highest height and with the most number of left connections or nodes; and 3) a randomly selected instances.

In one embodiment, the order of the sources to be used first is source 1, source 2, and then source 3. It should be noted that the order of the sources used can be different. In one embodiment, column will be populated with instances from a BFS tree branch having the most number of left connections/nodes. However, if none of the BFS branches fit this requirement, then instances belonging to a topology having the highest height in the augmentation diagram and with the most number of left nodes will be used to populate column. Similarly, if none of the instances fit the topology requirement, then a random instance is picked and placed in the column.

Figure 11B:
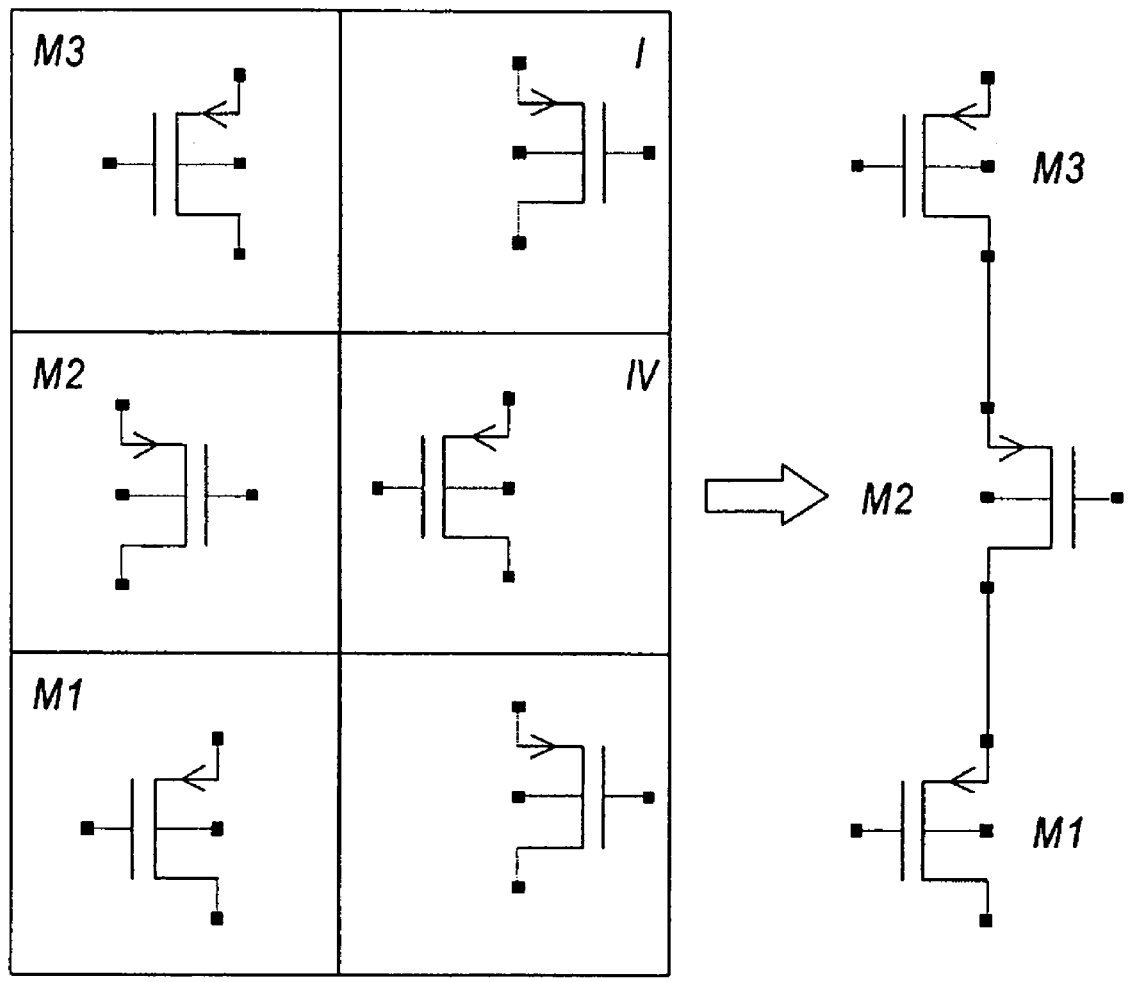

FIG. 11B illustrates how the topology cluster constraints are used by topology extractor 710 during placement according to one embodiment. Referring now to FIG. 11B, if any topology instance qualifies (based on probability of number of connections) to be placed in a certain column, then the entire column of the topology cluster is picked up and is placed in a column as is based on certain connection based probability. As an example, in FIG. 11B, if M1 qualifies to be placed in a column, then all the instances (M1, M2 & M3) of the same column of topology cluster are taken out and put in a temporary column. The placement probability is then computed for this set of instances. If it meets certain probability, the entire column is placed in the placement grid.

Figure 11C:
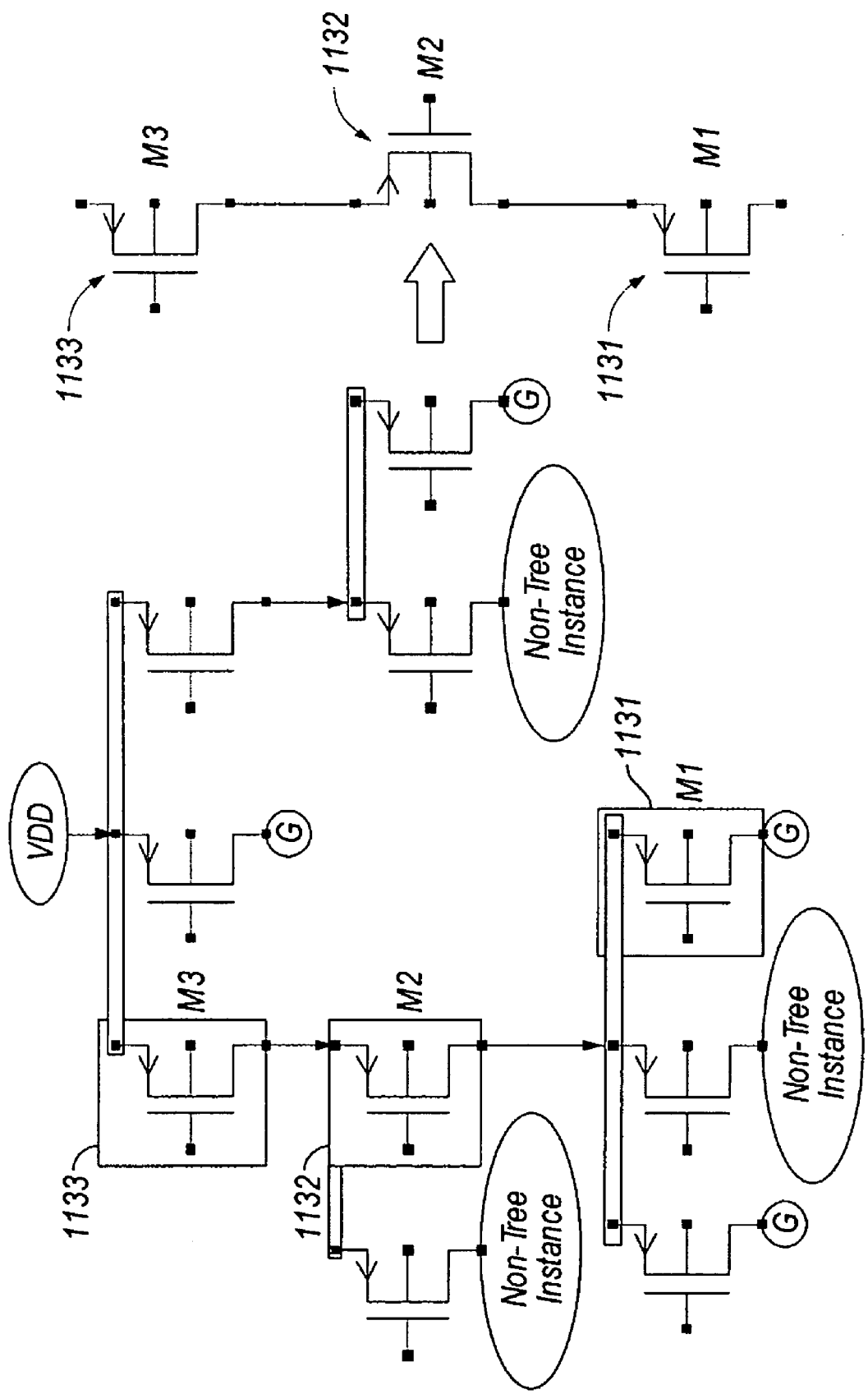

FIG. 11C illustrates how constraints created by BFS Tree builder 730 are used during placement according to one embodiment. Referring now to FIG. 11C, if any BFS instance qualifies (based on probability of number of connections) to be placed in a certain column, then all the ancestors of that instance are picked up and are placed in a column as is based on certain connection based probability. As an example, in FIG. 11C, if an instance 1131 qualifies to be placed in a column, then all the instances (1131, 1132, and 1133) of the same column of topology cluster are taken out and put in a temporary column. The placement probability is then computed for this set of instances. If it meets certain probability, the entire column is placed in the placement grid.

FIG. 11D illustrates how constraints generated by attachment determining module 740 are used during placement according to one embodiment. Referring now to FIG. 11D, a R2 (resistor) 1142 is a top attachment of an instance 1143 (M3). A resistor (R1) 1144 is a bottom attachment an instance 1145 (M1). As shown in FIG. 11D, a column 1150 shows instances 1143 (M3), 1145 (M1), and 1151 (M2), and placed in a column. After the candidate instances are placed in a column, the top and bottom attachment for each of the instances is placed. This is illustrated in a column 1157, resistor 1142 (R2) is placed in this column as the top attachment of instance 1143 (M3), and resistor 1144 (R1) gets placed as bottom attachment of instance 1145 (M1).

Referring again to FIG. 8, generally, in operations 860 & 870, automatic schematic generator 300 uses connection data from database 320 along with built-in and user-specified templates to generate a routed and fully placed data package. In one embodiment, the data package complies with OpenAccess standard and is stored in OA schematic database 330. Because data stored in database 330 are routed and placed, they may be viewed and edited using a schematic editor such as Cadence Virtuoso®. In one embodiment, the automatic schematic generator presents connectivity information using an open industry standard database such as the OpenAccess standard. Alternative embodiments may use other database formats or standards, such as EDIF (Electronic Design Interchange Format).

As mentioned, in a preferred embodiment OpenAccess is used for standard flows that require schematic connectivity information. The fully placed and routed OpenAccess schematic data generated by automatic schematic generator 300 can be used in other circuit designs, even those that are not based on the Virtuoso® Schematic Editor. Data stored in OA database 330 can then be rendered in any OA compliant schematic viewer, and edited by an OA compliant schematic editor. In alternative embodiments, other database standards such as EDIF may be used without departing from the scope of the invention, and other compliant schematic viewers supporting those standards can be used in a flow.

Further in operation 860, automatic schematic generator 300 performs a grid-based global placement of all instances taking into account of the placement constraints generated by builder 700 in operation 850. This grid-based global placement process is illustrated in FIGS. 11-14.

Figure 13:
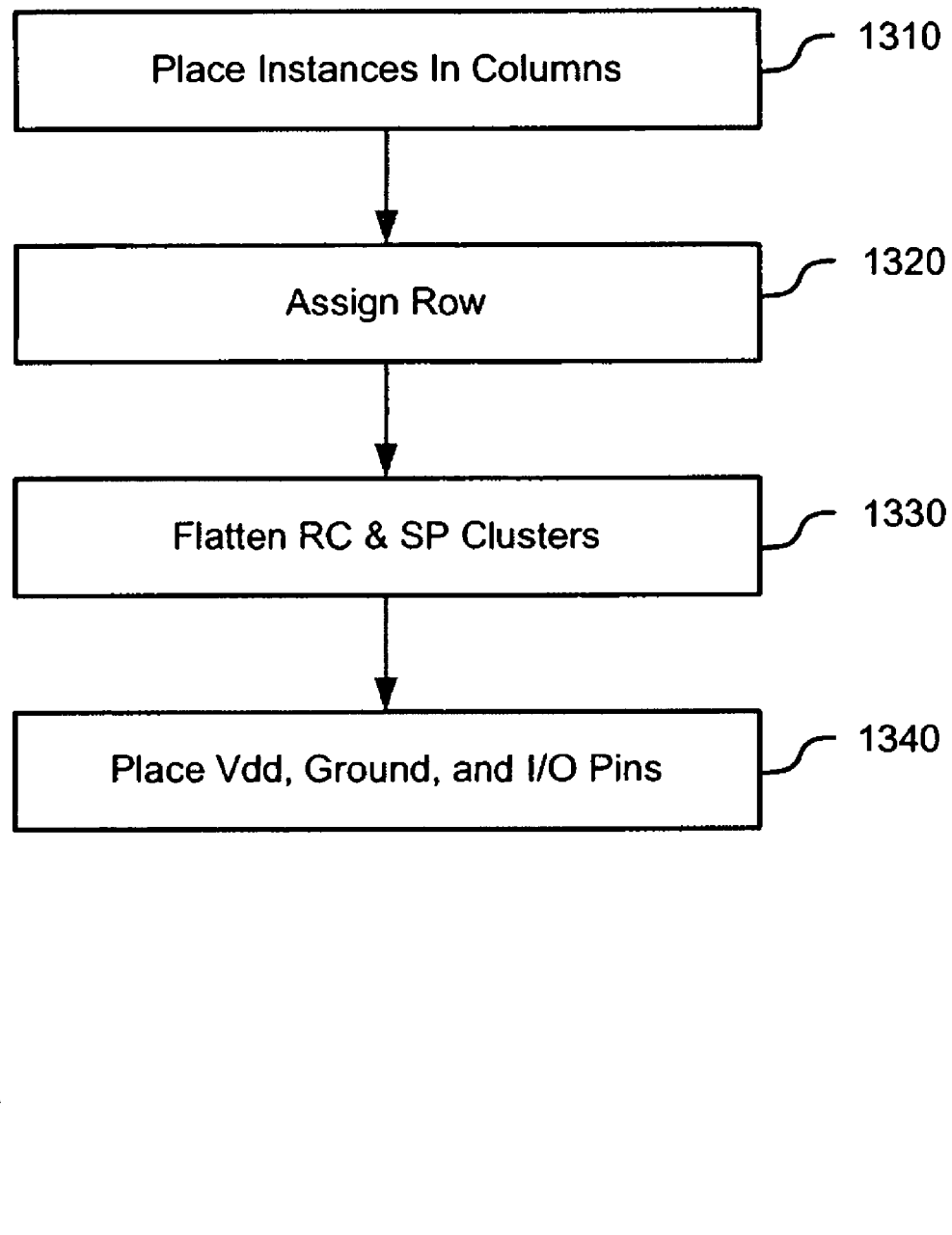
FIG. 13 illustrates an example process flow implemented by the schematic generator of FIG. 3 according to an embodiment of the present invention.

Let us now refer to FIG. 13, which illustrates a diagram illustrating the process flow for the grid-based global placement according to one embodiment of the present invention. As shown in FIG. 13, in an operation 1310, instances are placed into columns of grid 1100. In one embodiment, the grid-based global placement process starts by populating the columns of the grid 1100. In this operation, first column 1110 of grid 1100 can be populated with instances by searching for instances in a BFS tree branch having the most number of left connections or nodes. If such a branch cannot be identified or none of the branch fits the criteria, then column 1110 can be populated with instances of a topology cluster with the highest height and with the most number of left connections. If no topology instance can be found with the above criteria, then an instance is randomly selected and placed in column 1110.

Next, automatic schematic generator 300 looks for instances which can be placed on the left side of column 1110 (i.e., column 1120) by finding an unplaced instance whose non-left terminal (i.e., right terminal and upper and lower terminals) connects to one of the non-right terminal (i.e., left terminal and upper and lower terminals) of the placed instance in column 1110. This process continues as long as automatic schematic generator 300 can find a new column to be placed on left side of newly added column.

Next, automatic schematic generator 300 performs a symmetrical set of operations for placing instances to the right side of columns. In this operation, the process starts with the leftmost column. Load instances connected to the leftmost column are then located and placed to the column immediately right of the leftmost column. Load instances are unplaced instances whose non-right terminal connects to one of the non-left terminal of adjacent column. This process then repeats for the next column until no more load instance is left.

In one embodiment, if there are unplaced instances remaining, automatic schematic generator 300 performs the operations below.
 a) Start from the first column (1110), initialize a list of nets that ASG needs to visit, also referred to as a net-to-visit list. This net-to-visit list comprises only the nets connecting to the left ports of first column instances (represented by 'A' in 1110).
 b) Find instances whose right ports are connected to the nets in net-to-visit list.
 c) Place any such instances found in a new column and insert the new column to the left side of first column (refer column 1115).
 d) Update the net-to-visit list to reflect the addition of new nets ( refer the net list 'B') found in the new column;
 e) Repeat operation (c) until no more instances can be placed.

For any remaining unplaced instances, automatic schematic generator 300 repeats operations (a) through (e); however, this time automatic schematic generator 300 creates net connections on the right ports of already placed instances. Automatic schematic generator 300 also finds new instances whose left ports are connected to these nets and places them accordingly. Once all the instances are placed in columns in operation 1310, automatic schematic generator 300 assigns the row to the instances.

Figure 14:
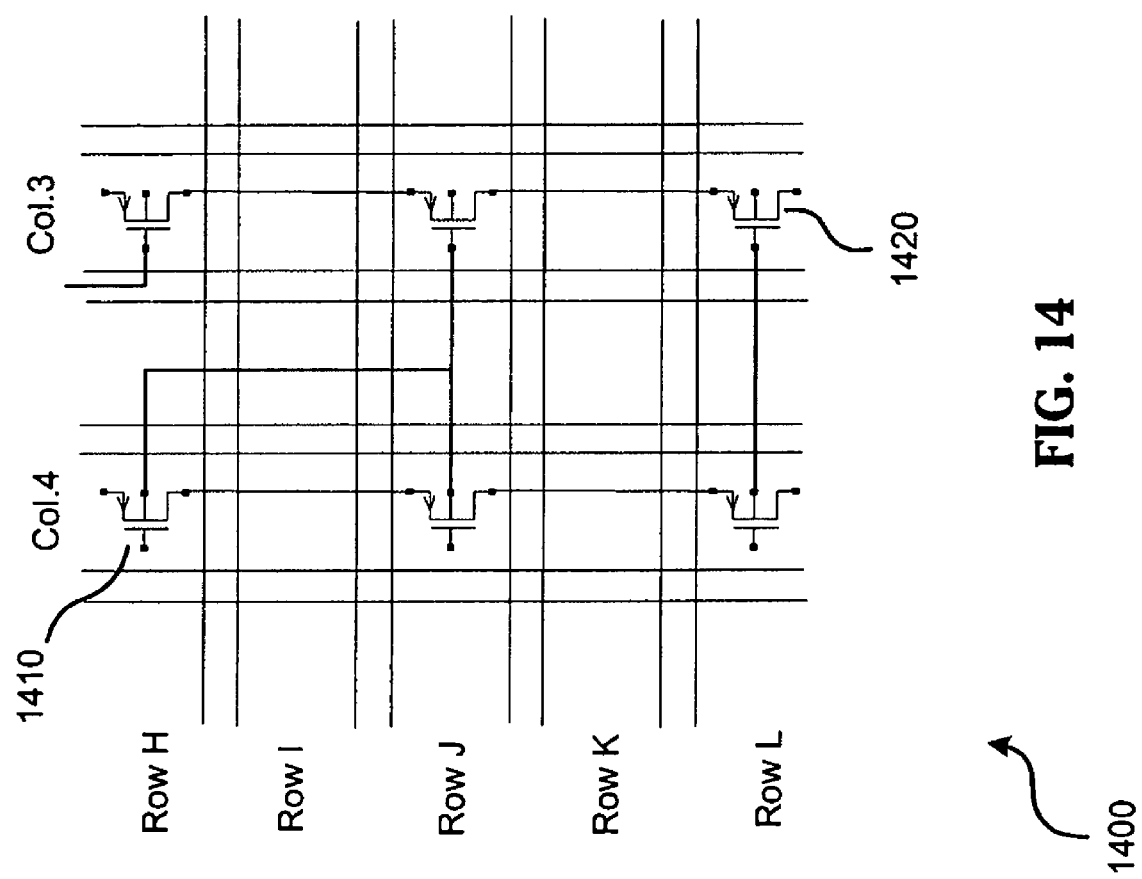
FIGS. 14-15 illustrate block diagrams of example grid-based placement schematics according to embodiments of the present invention.

In an operation 1320, in one embodiment, each instance of a column is assigned a row, which is a relative position of the instance within a grid of the final schematic. To better illustrates, let us refer to FIG. 14. FIG. 14 is a diagram of a final schematic in a grid generated by automatic schematic generator 300 according to one embodiment of the present invention. Referring to FIG. 14, a grid 1400 has Rows H-L and Cols. 3-4. As shown, an instance 1410 is located in Col. 4 and has been assigned to Row H. Similarly, an instance 1420 is located in Col. 3 and has been assigned to Row L.

Referring again to FIG. 13, in operation 1320 the row assignment of an instance can be determined using the following criteria: 1) tree instances are assigned a row based on their height in the BFS tree; 2) topology instances are assigned a row with respect to their relative vertical placement in the topology cluster; 3) top and bottom attachments are assigned a row with respect to the row of their attached instances; and 4) black box instance are assigned a row based on an average row of the row of instances connected to it. For example, assume a black box instance having 3 instances connected to it. Further assume that the row assignment for each of the instances is 1, 2, and 3. In this example, the average of the three row assignments is 2. Thus, the black box instance is assigned to row 2. It should be noted that other arithmetic functions, other than average, can be used such as, for example, mean, medium, maximum, minimum, etc.

Figure 15:
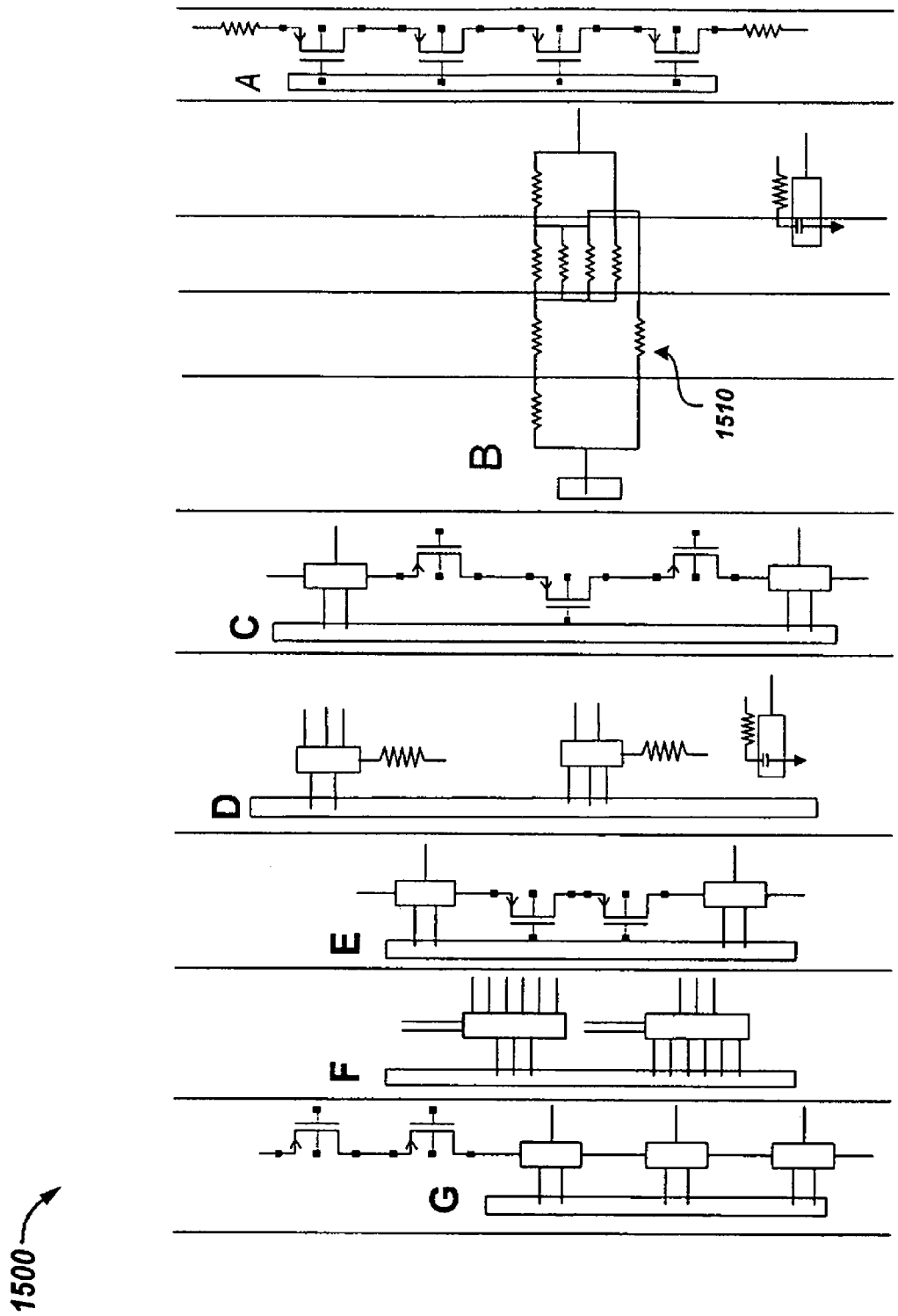

In an operation 1330, clustered RC and series-parallel instances (SPC) are flattened. An example of the flatten process is shown in FIG. 15. FIG. 15 is a diagram illustrating a grid-based placement schematic 1500 according to one embodiment of the present invention. Referring now to FIG. 15, instances 1510 is shown flattened, meaning certain circuit topologies will be presented sideway within the final schematic. In one embodiment, resistor-capacitor and series-parallel clusters are oriented sideway, as shown in FIG. 15. Once this operation is completed, $V_{dd}$, ground and I/O pins are placed in an operation 1340.

At this point, automatic schematic generator 300 finishes creating a fully placed circuit diagram that includes all of the circuit elements and instances defined in netlists 350a-c.

Referring now to operation 870 of FIG. 8, automatic schematic generator 300 performs a global routing on the fully placed circuit diagram. Automatic schematic generator 300 optimized the routing process such that it can be easily viewed and interpreted. Unlike a conventional routing process that routes schematic such that there is minimal wire lengths, see FIG. 1. The routing module of automatic schematic generator 300 ignores the minimal wire length rule and routes circuit elements far apart from each other to increase readability. As an example, let us refer back to FIG. 14. As shown in FIG. 14, Row 1 contains empty cells between the instance in Row H and the instance in Row J. In one embodiment, a shortest path is selected as the routing path between the bottom and top ports of those instances. In this way, the schematic can be presented in a cleaner manner and with less routing lines.

Figure 19:
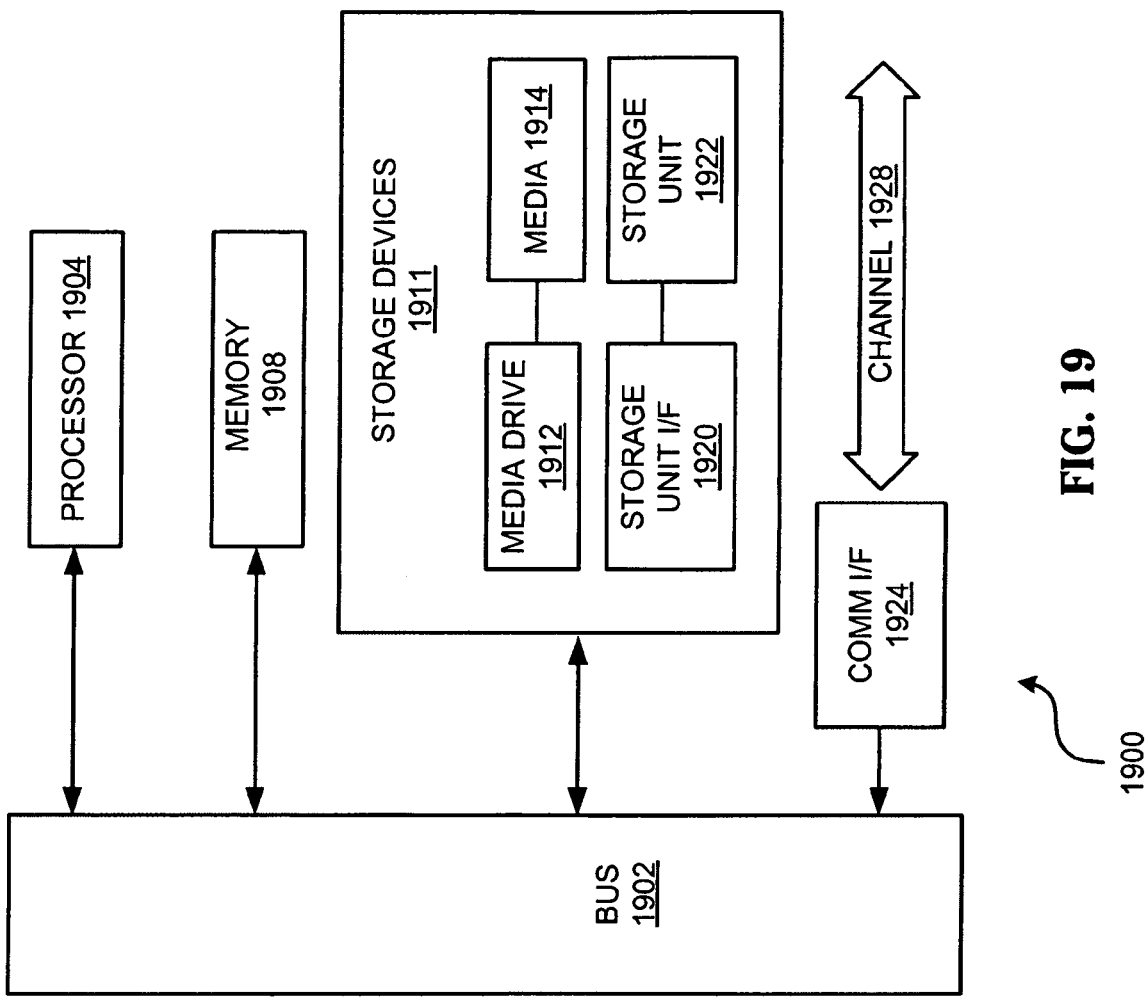
FIG. 19 illustrates an example computer system in which the schematic generator application of FIG. 3 can be implemented.

As used herein, the term module might describe a given unit of functionality that can be performed in accordance with one or more embodiments of the present invention. As used herein, a module might be implemented utilizing any form of hardware, software, or a combination thereof. For example, software, firmware, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 19. Various embodiments are described in terms of this example-computing module 1900. After reading this description, it will become apparent to a person skilled in the relevant art how to implement the invention using other computing modules or architectures.

Referring now to FIG. 19, computing module 1900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices such as, for example, digital cameras, navigation systems, cellular telephones, portable computing devices, modems, routers, WAPs, and other electronic devices that might include some form of processing capability.

Computing module 1900 might include, for example, one or more processors or processing devices, such as a processor 1904. Processor 1904 might be implemented using a general-purpose or special-purpose processing engine such as, for example, a microprocessor, controller, or other control logic. In the example illustrated in FIG. 19, processor 1904 is connected to a bus 1902 or other communication medium to facilitate interaction with other components of computing module 1900.

Computing module 1900 might also include one or more memory modules, referred to as main memory 1908. For example, preferably random access memory (RAM) or other dynamic memory, might be used for storing information and instructions to be executed by processor 1904. Main memory 1908 might also be used for storing temporary variables or other intermediate information during execution of instructions to be executed by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914, might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, 802.XX or other interface), a communications port (such as for example, a USB port, IR port, RS232 port Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1908, storage unit 1920, media 1914, and signals on channel 1928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the operations are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for generating a circuit schematic, comprising:
   using a computer system to identify a first group of instances that match a circuit template;
   defining placement and constraint data for instances of the first group;
   creating a circuit schematic having a grid by placing instances of the first group in the grid based on the placement and constraint data; and
   routing the instances of the first group using the placement and constraint data.

2. The method of claim 1, wherein defining placement and constraint data further comprising:
   specifying a pair of master devices;
   specifying a number of terminal pairs of instances;
   specifying a quadrant based relative position information of instance pairs;
   specifying orientation information for instance pairs; and
   specifying augmentation information for instance pairs.

3. The method of claim 2, wherein defining placement and constraint data further comprising creating a topology cluster based on a topology specification template.

4. The method of claim 2, wherein specifying the pair of master devices of instances comprises one or more of a n-type MOSFET transistor device (NMOS), a p-type MOSFET transistor device (PMOS), a NPN bipolar transistor device (NTX), and a PNP bipolar transistor device (PTX).

5. The method of claim 2, wherein creating the topology cluster further comprising specifying a number of terminal pairs, wherein a first terminal pair belongs to the first instance and a second terminal pair belongs to a second instance.

6. The method of claim 2, wherein creating the topology cluster further comprising specifying a quadrant based location to instances matching the pair of master devices and the number of terminal pairs.

7. The method of claim 2, wherein creating the topology cluster further comprising specifying orientation information to instances matching the pair of master devices and the number of terminal pairs.

8. The method of claim 2, wherein creating the topology cluster further comprising specifying augmentation information to instances matching the pair of master devices and the number of terminal pairs.

9. The method of claim 8, wherein the augmentation information comprises: NONE, HORIZONTAL, VERTICAL, DIAGONAL, or Darington Pair augmentation information.

10. The method of claim 1, wherein the circuit template comprises a built-in template.

11. The method of claim 1, wherein identifying the first group of instances further comprising extracting connectivity data of the first group of instances from a netlist that match the circuit template.

12. The method of claim 1, wherein the column of a topology cluster is placed probabilistically in a schematic placement grid, and wherein each cluster is assigned a row based on a relative placement in the topology cluster.

13. The method of claim 1, wherein defining placement and constraint data comprises:
    identifying a second group of instances that contains only two-terminal devices;
    clustering the identified two-terminal devices; and
    creating a dummy instance for each clustered two-terminal devices.

14. The method of claim 13, wherein a two terminal device is a device having only two terminals with each terminal in opposite direction.

15. The method of claim 14, wherein for each two-terminal instance cluster, a dummy instance is created, wherein dummy ports of a dummy instance are created for each net that connects to an instance which does not belong to the same two-terminal cluster.

16. The method of claim 14, wherein for each two-terminal cluster, the instances and their connections belonging to this cluster are removed from the instance and connectivity lists, respectively.

17. The method of claim 14, wherein the dummy instance and dummy port connections for each cluster are inserted in the instance and instance connection list, respectively.

18. The method of claim 13, the cluster of two terminal devices comprises: a resistor-capacitor circuit or a series-parallel circuit cluster (SPC).

19. The method of claim 18, wherein the SPC cluster is created by first finding parallel instances and expanding the parallel instances in a direction of a port.

20. The method of claim 19, wherein expanding the parallel instances comprises:
    adding a two terminal instance in series on one side of the SPC cluster.

21. The method of claim 18, wherein while creating cluster of two terminal instances, each instance is assigned relative row and column values.

22. The method of claim 1, wherein defining placement and constraint data further comprising creating a breadth-first search (BFS) tree.

23. The method of claim 22, wherein creating the breadth-first search (BFS) tree further comprising identifying instances in the first group having a top port being connected to a power net, wherein the identified instances are added at the level zero of the breadth-first search (BFS) tree.

24. A computer system for generating a circuit schematic, the computer system comprising:
    a processor;
    a memory connected to the processor; and
    a non-transitory computer readable medium having instructions embedded therein, the instructions configured to cause the processor to perform the operations of:
        identifying a first group of instances that match a circuit template;
        defining placement and constraint data for instances of the first group;
        creating a circuit schematic having a grid by placing instances of the first group in the grid based on the placement and constraint data; and
        routing the instances of the first group using the placement and constraint data.

\* \* \* \* \*